(12) United States Patent
Elsallal et al.

(10) Patent No.: US 9,513,361 B1
(45) Date of Patent: Dec. 6, 2016

(54) DIRECTION FINDING BAVA ARRAY WITH INTEGRATED COMMUNICATIONS ANTENNA SYSTEM AND RELATED METHOD

(71) Applicants: M. Wajih A. Elsallal, Acton, MA (US); James B. West, Cedar Rapids, IA (US)

(72) Inventors: M. Wajih A. Elsallal, Acton, MA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 876 days.

(21) Appl. No.: 13/871,685

(22) Filed: Apr. 26, 2013

(51) Int. Cl.
*G01S 3/14* (2006.01)
*H01Q 21/06* (2006.01)
*H01Q 13/08* (2006.01)

(52) U.S. Cl.
CPC ............ *G01S 3/146* (2013.01); *H01Q 13/085* (2013.01); *H01Q 21/064* (2013.01)

(58) Field of Classification Search
CPC ........ G01S 3/143; G01S 3/146; H01Q 13/085; H01Q 21/064
See application file for complete search history.

(56) References Cited

U.S. PATENT DOCUMENTS

| | | | | |
|---|---|---|---|---|
| 4,115,782 A * | 9/1978 | Han | ..................... | H01Q 1/288 343/779 |
| 6,519,478 B1 * | 2/2003 | Scherzer | ................ | H01Q 1/246 343/725 |
| 6,552,691 B2 * | 4/2003 | Mohuchy | ............. | H01Q 13/085 343/770 |
| 6,650,291 B1 * | 11/2003 | West | ........................ | H01Q 3/46 342/371 |
| 7,414,590 B2 * | 8/2008 | Bij De Vaate | ....... | H01Q 9/0457 343/770 |

(Continued)

OTHER PUBLICATIONS

Langley, et al. "Balanced Antipodal Vivaldi Antenna for Wide Bandwidth Phased Arrays," IEE Proc. Microwave Antennas Propagation, vol. 143, No. 2, Apr. 1996, pp. 97-102.*

(Continued)

*Primary Examiner* — Gregory C Issing
(74) *Attorney, Agent, or Firm* — Angel N. Gerdzhikov; Donna P. Suchy; Daniel M. Barbieri

(57) ABSTRACT

A system and related method is disclosed including a symmetrical array of Balanced Antipodal Vivaldi Antenna (BAVA) elements. Within the array a plurality of dual polarization sub-arrays comprised of individual BAVA elements oriented in a first polarization and individual BAVA elements oriented in a second polarization. The plurality of sub-arrays maintains low mutual coupling and cross polarization rejection between sub-arrays within the array and between elements within the sub-array. As a signal is received by each of the individual BAVA elements, signals from each first polarized BAVA element and each second polarized BAVA element of a sub-array are combined to produce a single signal of the first polarization and a single signal of the second polarization per sub-array. A DF processor receives the two signals and determines the angle of arrival of the signal. A communications link within the array sends and receives information and commands for array operation.

20 Claims, 18 Drawing Sheets

(56) References Cited

U.S. PATENT DOCUMENTS

| | | | |
|---|---|---|---|
| 8,466,846 B1* | 6/2013 | Elsallal | H01Q 1/38 |
| | | | 343/700 MS |
| 2008/0211726 A1* | 9/2008 | Elsallal | H01Q 21/064 |
| | | | 343/770 |
| 2011/0057852 A1* | 3/2011 | Holland | H01Q 9/28 |
| | | | 343/795 |

OTHER PUBLICATIONS

Krishnaveni et al. "Beamforming for Direction of Arrival (DOA)—A Survey." International Journal of ComputerApplications, vol. 61, No. 11, Jan. 2013, pp. 4-11.*
CB Dietrich Jr 2000 thesis, "Adaptive Arrays and Diversity Antenna Configurations for Handheld Wireless Communication Terminals", pp. 29-43.*

* cited by examiner

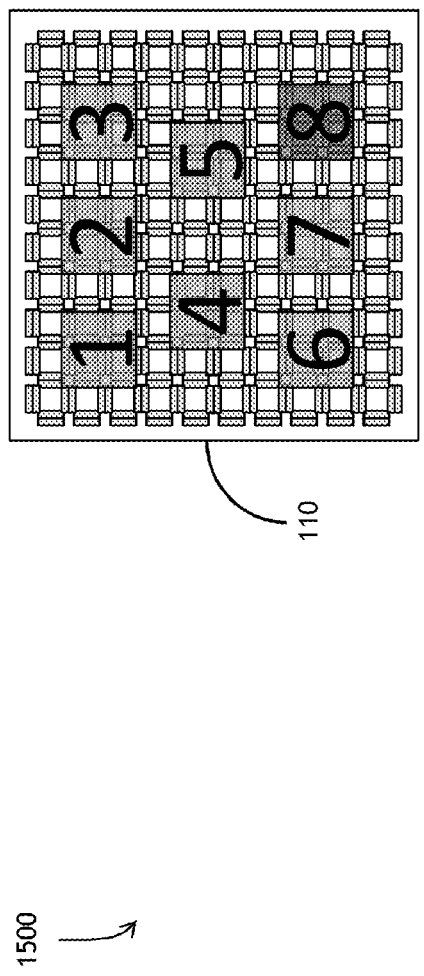
FIG. 15A
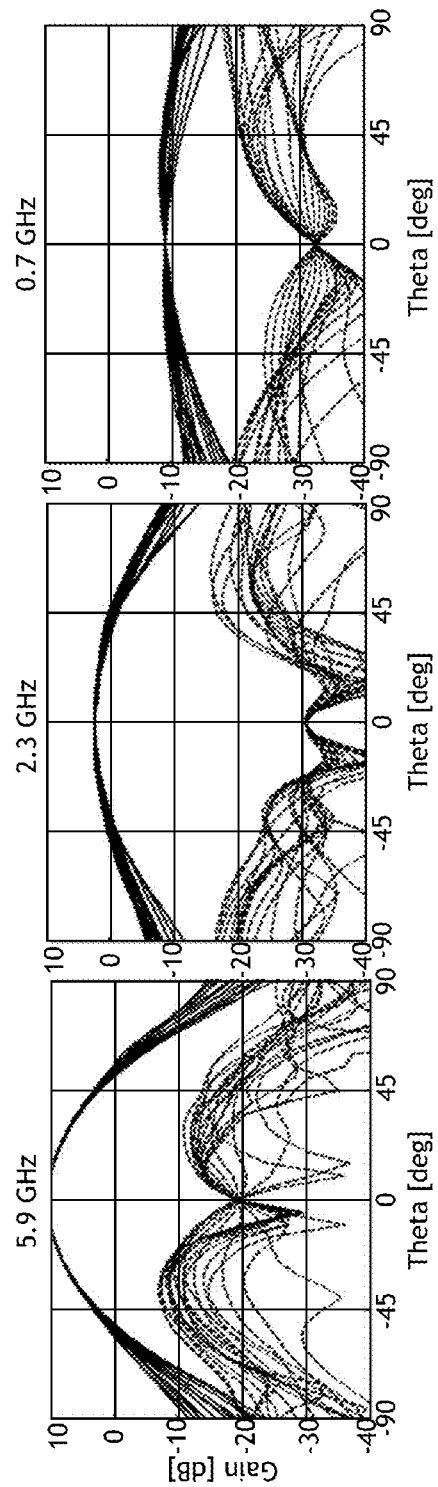
FIG. 15D
FIG. 15C
FIG. 15B

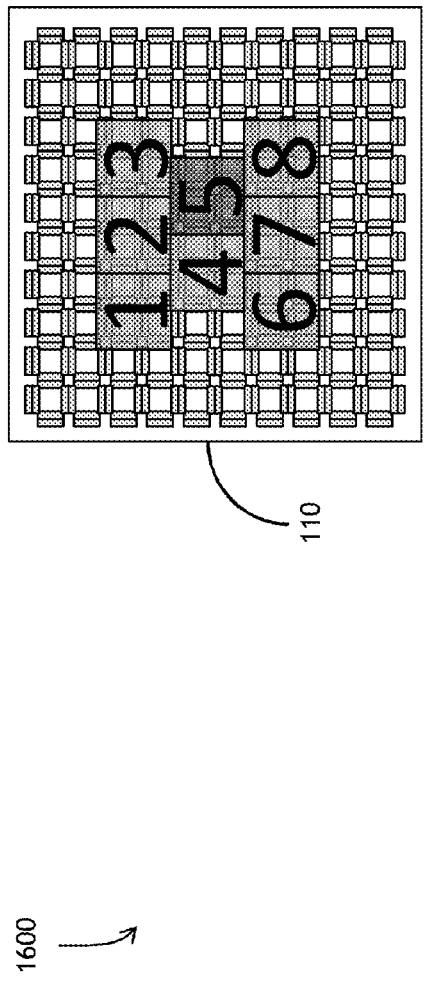
FIG. 16A
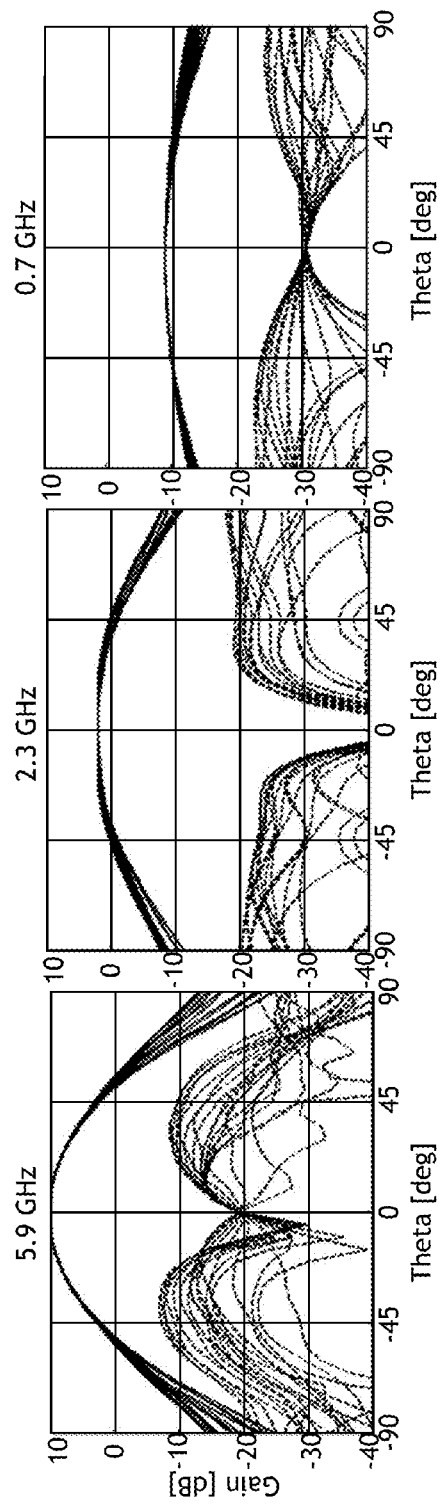
FIG. 16B
FIG. 16C
FIG. 16D

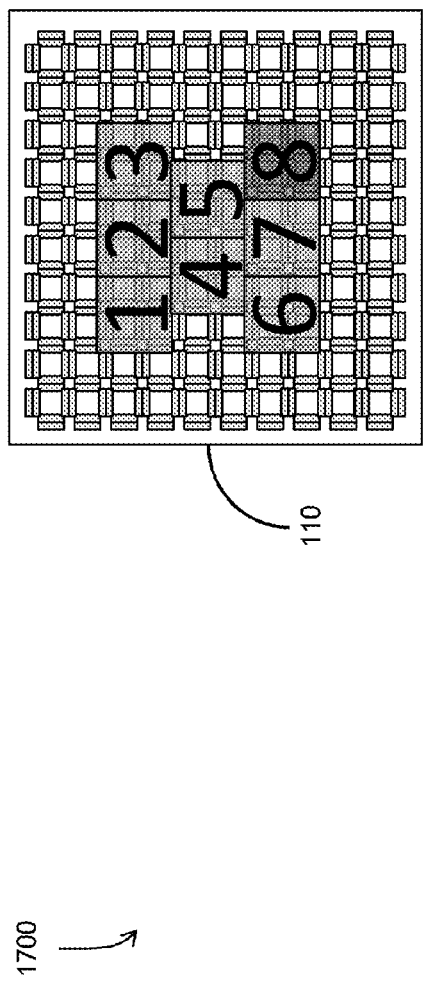
FIG. 17A
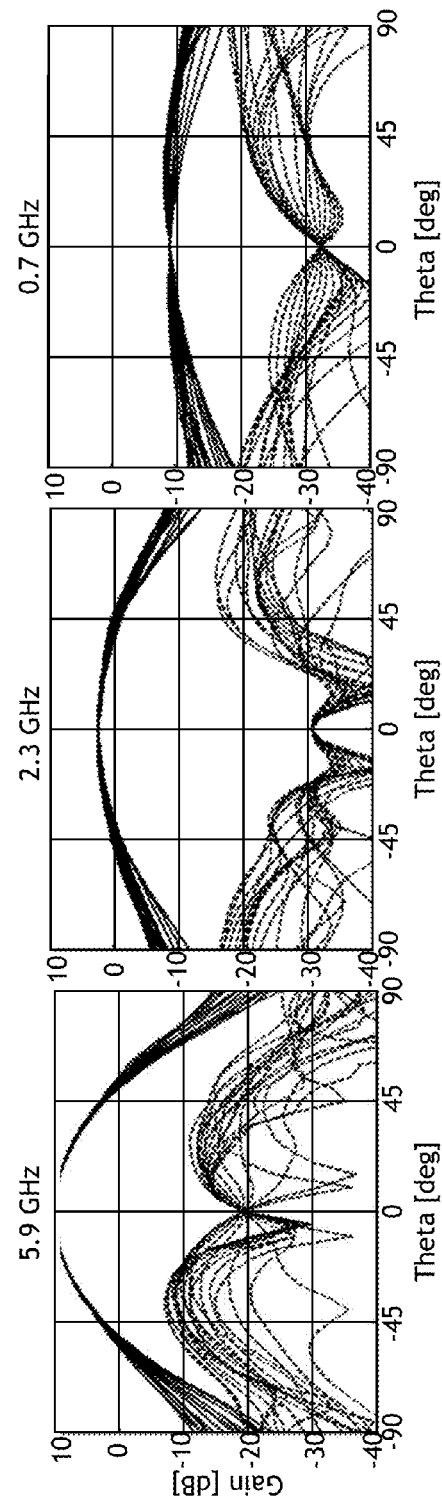
FIG. 17B
FIG. 17C
FIG. 17D

DIRECTION FINDING BAVA ARRAY WITH INTEGRATED COMMUNICATIONS ANTENNA SYSTEM AND RELATED METHOD

FIELD OF THE INVENTION

The present invention relates generally to mobile direction finding (DF) radiating elements and construction thereof. More particularly, embodiments of the present invention relate to a system and device for an enhanced DF array employing a small volume Balanced Antipodal Vivaldi Antenna (BAVA) DF array.

BACKGROUND OF THE INVENTION

Signals Intelligence (SIGINT) may be defined as reception of a signals (e.g., learning things) about those who may emit a Radio Frequency (RF) signal. SIGINT may be further broken down into Electronic Intelligence (␣ELINT) comprising identification and classification of enemy radar systems (e.g., radar sniffing); and Communications Intelligence (COMINT) comprising gathering information relative to the signals used for general communications purposes. Further, Intelligence, Surveillance and Reconnaissance (ISR) may be defined as activity focused on synchronization and operational deployment of assets capable of SIGINT and further dissemination of the received and processed information.

A wide variety of systems may be usable for SIGINT operations of acquiring and processing RF and DF information. Traditional ISR systems may range in size from hand-held devices to orbiting satellites. Some systems collect basic information for a wide range of analytical products while others are designed to acquire data for specific weapons systems. SIGINT systems may be global, theater based or tactical in nature and coverage.

Precision DF (PDF) Systems are traditionally based on multiple antenna elements strategically positioned relative to one another for DF algorithms to process the direction of arrival (DOA) of the intended signal. Phase Interferometer Direction Finding (PIDF), Amplitude Monopulse Direction Finding (AMPDF), Pseudo Doppler (PDDF) may be some examples of these traditional multiple antenna systems. A typical DF systems may use at least 4 antenna elements (spaced every 90° about 360° for full azimuthal coverage), plus an additional omnidirectional antenna element for general target sensing and as a communications link.

One traditional goal of COMINT may include hardware which is not easily visually detectable. A Low Observable (LO) antenna may aid operators in a successful COMINT operation. Antenna size/volume is a direct function of wavelength where antenna size is inversely proportional to frequency. For example, a classic $\lambda/4$ whip antenna measures 4.9 ft. tall @ 50 MHz which falls outside of the LO definition. In addition to physical size, electrically small antennas may function in a COMINT role however these electrically small antennas suffer from an intrinsically narrow band of coverage. For traditional ELINT (2—18+GHz) and COMINT (HF—5 GHz) the desired hardware needs to be fundamentally broadband.

Traditional DF algorithms may require sophisticated data to accurately determine a precise DF solution. For example, Precision Interferometric DF (PIDF) algorithms may require a low far field radiated phase wobble on the wave (WoW) as well as low amplitude WoW in azimuth. In addition, these algorithms require a 3 dB beam width in elevation and minimum mutual coupling between DF array elements. Also, for maximum accuracy, PIDF systems require a precision phase center that is highly repeatable between the DF radiation elements.

Traditional Interferometer DF solutions require an undesirable linear array of antennas to perform accurate DF measurements. Embedded circuitry measures phase difference of received signal between multiple antenna pairs and algorithms calculate a DF angle from phase measurements. These DF solutions are then inserted into a Pulse Descriptor Word (PDW) for downstream processing.

Amplitude Mono-Pulse DF (AMPDF) requires high element to element uniformity in: 1) 3 dB beam width, 2) peak of beam direction, 3) azimuth pattern symmetry, and 4) element gain. Most importantly though, AMPDF requires low antenna element-to-element mutual coupling to maintain accuracy.

Traditional DF array with multi-arm planar spirals have proven successful in accurate DF while being relatively small in size. However, this planar spiral architecture suffers from a loss of approximately 3 dB of gain due to half of the energy being absorbed by back pattern absorbent material and greater size requirements due to required placement of the absorbent material distant from the spiral.

Traditional multi-arm planar spiral antenna elements are too sizable in circumference and height for a given frequency band to permit successful covert SIGINT goals herein. Spiral antenna elements are unattractive below frequencies of 2 GHz for DF applications and maintain poor radiation efficiency due to absorber loading within the element cavity. Further, spiral antenna elements are expensive to produce due to the required high touch labor in manufacturing calibration during testing.

Additional traditional COMINT DF systems may employ air-loaded Transverse Electromagnetic (TEM) horn antennas. However, TEM horns suffer from poor radiation performance which severely degrades radiation efficiency (i.e., gain) in the lower frequency bands below approximately 2 GHz.

Successful covert SIGINT intelligence gathering and long-term ISR operations may require DF arrays to maintain High Direction of Arrival (DOA) precision while being Low Observable (e.g., unobtrusive, physically small, and highly portable). Additional characteristics including physically small size, low Radar Cross Section (RCS), Ultra Wide Band (UWB), and high electrical performance may be required to ensure future successful SIGINT operations. Consequently, a need remains for an alternative to large form factor antenna arrays which require increased size and undesirable visibility.

SUMMARY OF THE INVENTION

Accordingly, an embodiment of the present invention is directed to a system for determining a direction of arrival of a signal, the system comprising a plurality of Balanced Antipodal Vivaldi Antenna (BAVA) elements, the plurality of BAVA elements structured in an array, a first dual polarization sub-array of the plurality of BAVA elements within the array, the first dual polarization sub-array including at least four BAVA elements oriented in a first polarization and at least four BAVA elements oriented in a second polarization, the second polarization being orthogonal to the first polarization, the at least four BAVA elements oriented in the first polarization and the at least four BAVA elements oriented in the second polarization being adjacent to each other, a plurality of dual polarization sub-arrays of the plurality of BAVA elements within the array, each of the plurality of dual polarization sub-arrays including at least four BAVA elements oriented in the first polarization and at least four BAVA elements oriented in the second polarization, the at least four BAVA elements oriented in the first polarization and the at least four BAVA elements oriented in a second polarization being adjacent to each other, a combiner circuit of the first polarization configured for receiving an output from the BAVA elements oriented in the first polarization and combining the output to produce a combined signal of the first polarization, a combiner circuit of the second polarization configured for receiving an output from the BAVA elements oriented in the second polarization and combining the output to produce a combined signal of the second polarization, a processor configured for: receiving an input including the combined signal of the first polarization and the combined signal of the second polarization, determining a direction of arrival of the signal based on the input, transmitting the determined direction of arrival to one of: a display and a communications link.

An additional embodiment of the present invention includes a symmetric array of rows and columns of BAVA elements oriented in 10 rows of BAVA elements orthogonal to and layered with 10 columns of BAVA elements, each row comprising 11 BAVA elements and each column comprising 11 BAVA elements, the columnar BAVA elements oriented perpendicular to a direction of the columns and the rowed BAVA elements oriented perpendicular to a direction of the row.

An additional embodiment of the present invention includes an array where the plurality of dual polarization sub-arrays is distant from 1) the first dual polarization sub-array and 2) each other of the plurality of dual polarization sub-arrays by at least one of: a row of BAVA guard elements and a column of BAVA guard elements.

An additional embodiment of the present invention includes each of plurality of dual polarization sub-arrays is adjacent to at least one of: the first dual polarization sub-array and one of the plurality of dual polarization sub-arrays.

An additional embodiment of the present invention includes at least eight dual polarization sub-arrays oriented with at least one of: a row of BAVA guard elements and a column of BAVA guard elements between each one of the dual polarization sub-arrays within the array.

An additional embodiment of the present invention includes at least eight dual polarization sub-arrays, each one of the dual polarization sub-arrays is oriented adjacent to at least two of the dual polarization sub-arrays.

An additional embodiment of the present invention discloses a method for determining a direction of arrival of a received signal, the method comprising: orienting a plurality of Balanced Antipodal Vivaldi Antenna (BAVA) elements into an array of rows and columns, the array sized for direction finding of a signal, designating at least four adjacent BAVA elements of the first polarization of the plurality of BAVA elements as elements of a first dual polarization sub-array, designating at least four adjacent BAVA elements of the second polarization of the plurality of BAVA elements as elements of the first dual polarization sub-array, the adjacent BAVA elements of the first polarization being orthogonal to the adjacent BAVA elements of the second polarization, designating at least four adjacent BAVA elements of the first polarization of the plurality of BAVA elements as elements of each one of a plurality of dual polarization sub-arrays, each one of the plurality of dual polarization sub-arrays being independent of the first dual polarization sub-array, designating at least four adjacent BAVA elements of the second polarization of the plurality of BAVA elements as elements of each one of the plurality of dual polarization sub-arrays, receiving a signal, via at least one of the first dual polarization sub-array and the plurality of dual polarization sub-arrays, combining the signal from each one of the adjacent BAVA elements of the first polarization within each dual polarization sub-array to a combined signal of the first polarization, combining the signal from each one of the adjacent BAVA elements of the second polarization within each dual polarization sub-array to a combined signal of the second polarization, determining the direction of arrival of the received signal based on the combined signal of the first polarization and the combined signal of the second polarization, transmitting the direction of arrival of the received signal via a omnidirectional transmitter.

An additional embodiment of the present invention includes method for determining a direction of arrival of a received signal, the method comprises: orienting means for situating a plurality of Balanced Antipodal Vivaldi Antenna (BAVA) elements into an array of rows and columns, the array sized for direction finding of a signal, designating means for identifying a plurality of dual polarization sub-arrays within the array, means for receiving a signal, means for combining an output of the first polarization from at least one of the plurality of dual polarization sub-arrays to produce a combined signal of the first polarization, means for combining an output of the second polarization from at least one of the plurality of dual polarization sub-arrays to produce a combined signal of the second polarization, means for determining the direction of arrival of the received signal based on the combined signal of the first polarization and the combined signal of the second polarization, means for transmitting the direction of arrival of the received signal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 15A is a diagram of multiple BAVA arrays embedded within a larger grid of BAVA elements with a single array of eight BAVA elements active exemplary of an embodiment of the present invention;

FIGS. 15B-15D are graphs of gain in dB versus theta in degrees representative of an embodiment of the present invention;

FIG. 16A is a diagram of multiple BAVA arrays embedded within a larger grid of BAVA elements with a single array of eight BAVA elements active exemplary of an embodiment of the present invention;

FIGS. 16B-16D are graphs of gain in dB versus theta in degrees representative of an embodiment of the present invention;

FIG. 17A is a diagram of multiple BAVA arrays embedded within a larger grid of BAVA elements with a single array of eight BAVA elements active exemplary of an embodiment of the present invention;

FIGS. 17B-17D are graphs of gain in dB versus theta in degrees representative of an embodiment of the present invention;

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention are directed to a small form factor array of BAVA elements oriented in rows and columns configured for accurate DF of a received signal. The array is further configured with multi-element dual polarization sub-arrays within the array to receive the desired signal.

One goal of the present invention is to provide a small form factor antenna array concealable within a variety of structures. For example, an antenna array structurally embedded into a brief case or back pack may allow successful covert SIGINT operations. Similarly, vehicular panels, building walls, billboards, conformal aircraft panels, and advertising signage may be configured with an embodiment of the present invention to ensure covert SIGINT operations. These devices configured with an embodiment of the present invention and also configured with an omnidirectional antenna may allow for convert SIGINT operations as well as transmission of the SIGINT information to a location remote from the antenna array. Further, vehicles performing SIGINT operations configured with an embodiment of the present invention may do so free of highly visible antenna elements or "whip" style antenna elements marking the SIGINT vehicles as a potential target.

An additional goal of the present invention is a device capable of remote SIGINT operations where the receiving antenna array is configured with a processor and transmitter to remotely transmit received information distant from the antenna array. Further, a highly scalable egg-crate design may allow for increased scalability and versatility of construction.

An additional goal of the present invention includes an antenna array capable of instantaneous bandwidth of approximately 8.5:1 demonstrated in a compact physical volume. This instantaneous bandwidth indicates a desirable instantaneous wide frequency band device remaining free of a tuning requirement.

An additional goal of the present invention includes an arbitrary polarization capability with dual-linear Right Hand Circular Polarization (RHCP) and Left Hand Circular Polarization (LHCP) capacity. In addition the present invention maintains a desirable low cross polarization for polarimetric DF algorithms.

Figure 1:
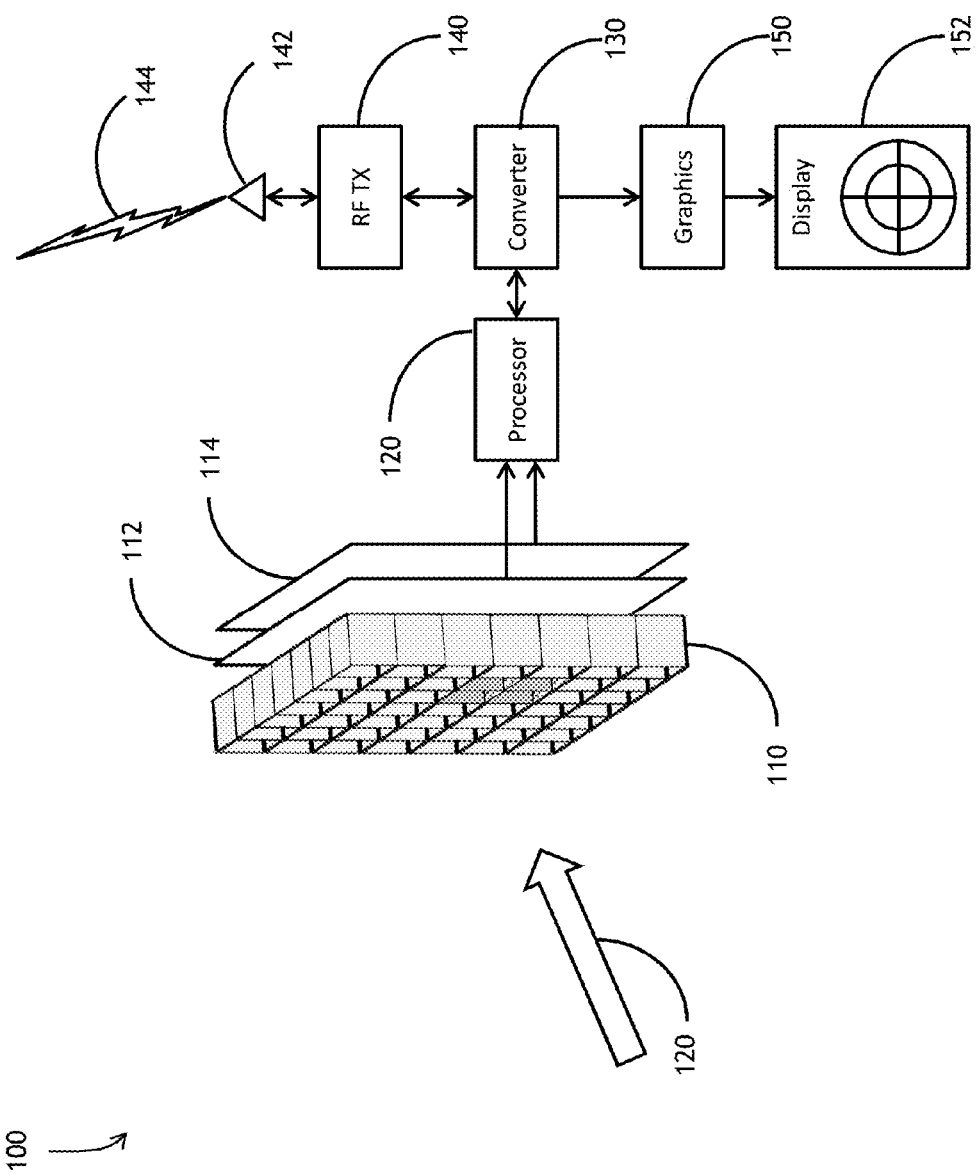
FIG. 1 is an overview of a system for direction finding (DF) exemplary of an embodiment of the present invention.

Referring to FIG. 1, an overview of a system for direction finding (DF) exemplary of an embodiment of the present invention is shown. System 100 includes BAVA array 110 configured for receiving a Radio Frequency (RF) signal 120 via individual BAVA elements. Combiner circuits 112 and 114 receive the signal of the first polarization and the signal of the second polarization from the BAVA array 110 and transmit the signal to processor 120. Converter 130 operates to further refine the signal for transmission through RF transmitter 140 and omnidirectional antenna 142. Information signal 144 may be transmitted to a location remote from the BAVA array to optionally provide remote SIGINT operations. Alternatively, Converter 130 may refine the signal for acceptance by a graphics engine 150 for presentation on a display 152 or additional device perceptible by an operator.

Figure 2:
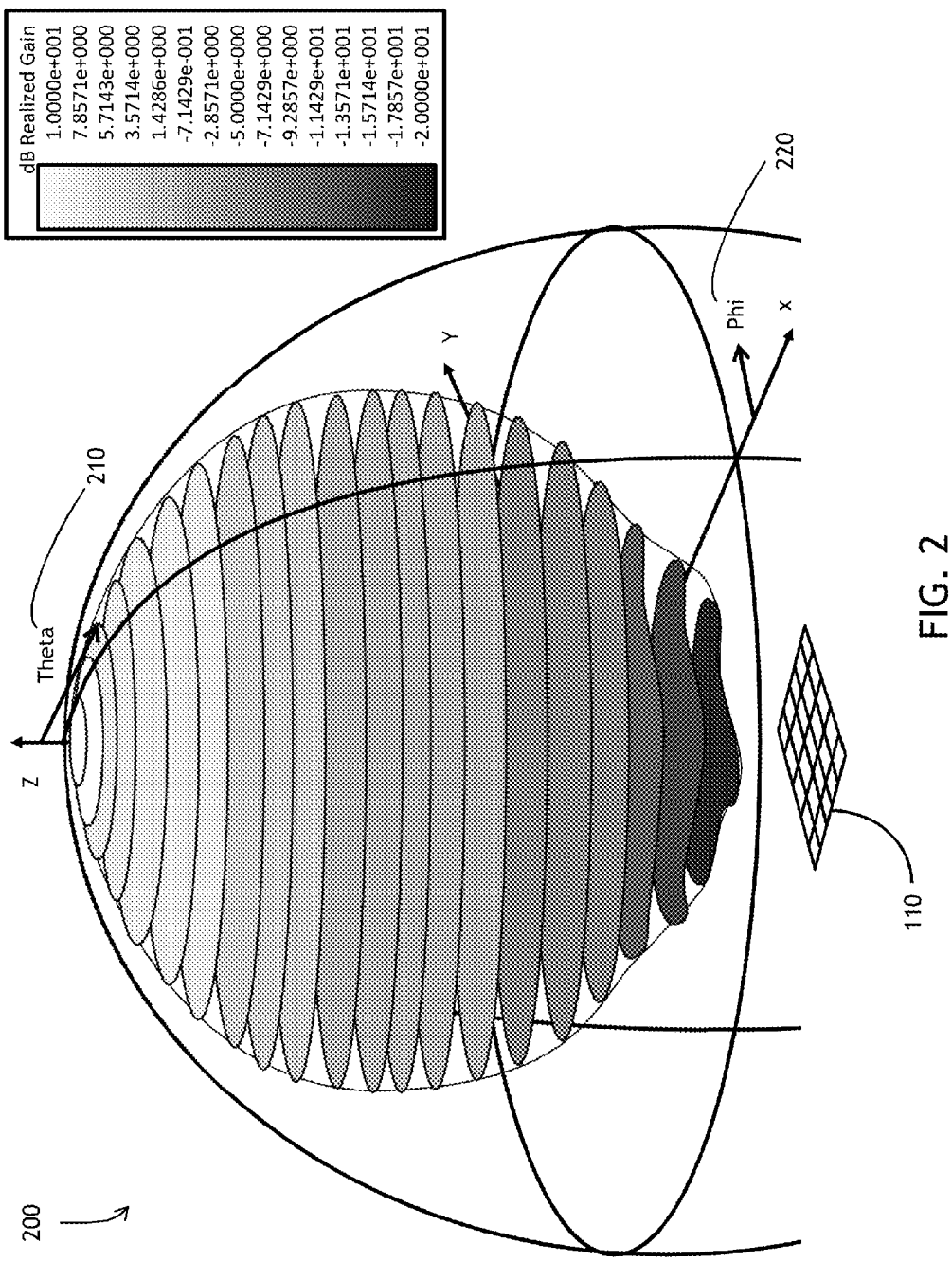
FIG. 2 is a three dimensional diagram of decibels of realized gain over various angles of transmission/reception exemplary of an embodiment of the present invention.

Referring to FIG. 2, a three dimensional diagram of decibels of realized gain over various angles of transmission/reception exemplary of an embodiment of the present invention is shown. As used herein, the angles Theta 210 and Phi 220 indicate the angle of arrival of the signal 120. Realized gain may increase from −2.0000e+001 near 90 degrees Theta 210 to 1.0000e+001 near 0 degrees Theta 210. The signal remains nearly uniform throughout Phi 220 values from 0 to 90 with slight deviation near the BAVA DF array 110.

An additional goal of the present invention includes a high radiation pattern performance where unidirectional patterns provide full azimuthal angular coverage with high radiation efficiency. Within the BAVA array there are no requirements for a cavity absorber as required in cavity backed spiral antennas. Within the BAVA array pattern, elevation patterns maintain a 2 dB ripple while there is no pattern wobble in azimuth and a 3 dB beam width ranges between 55.6 degrees Theta 210 to 110 degrees Theta 210.

An additional goal of the present invention is maintaining an electrically small antenna with a gain of approximately 10 decibel gain isotropic (dBi) at high end of the frequency band to approximately −9 dBi at the low end of the frequency band. The BAVA array maintains a positive balance between performance and size represented by ultra-broadband capability coupled with its small size creates this desirable balance.

Figure 3:
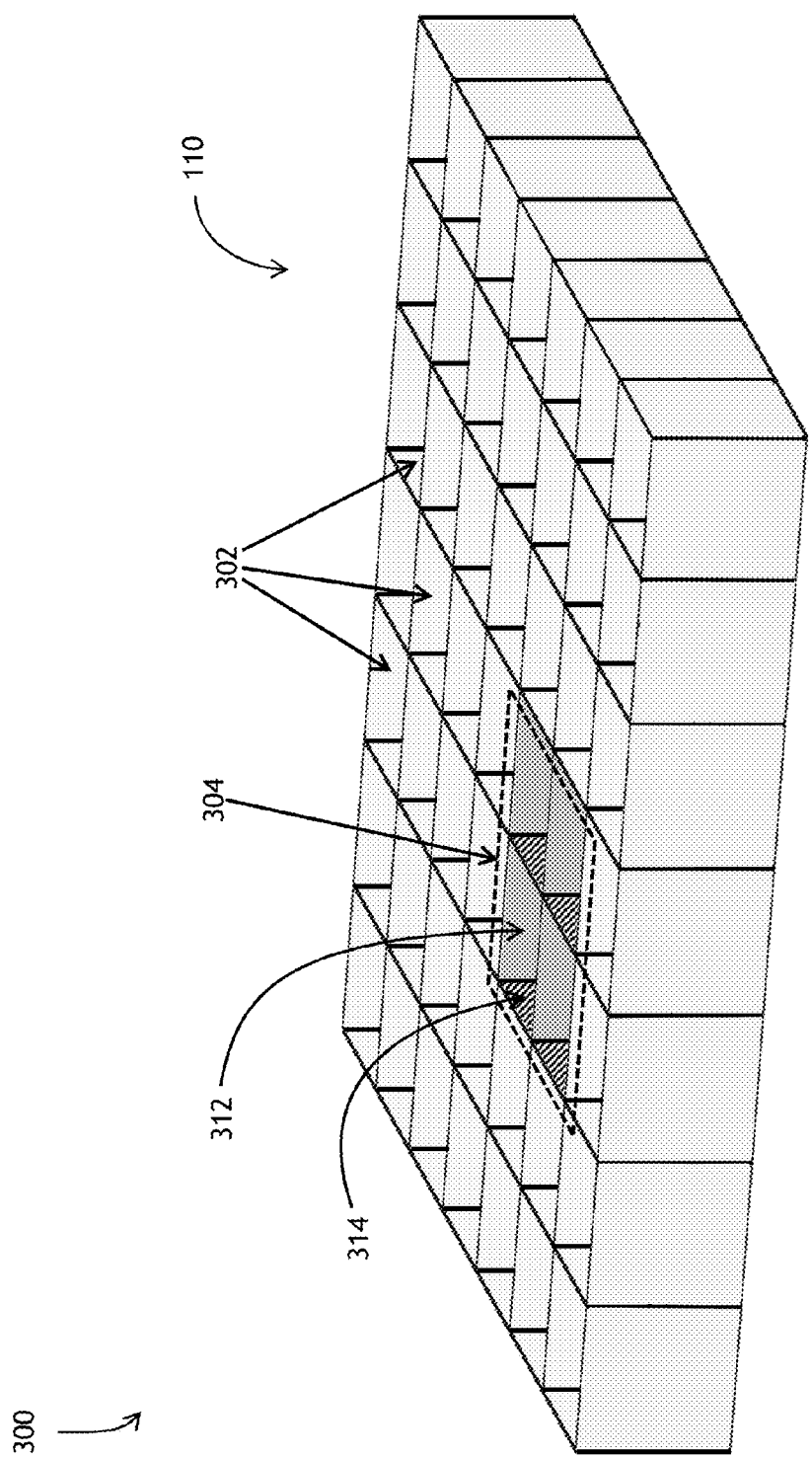
FIG. 3 is a diagram of a multi-element DF BAVA array structurally integrated as a continuous unit exemplary of an embodiment of the present invention.

Referring to FIG. 3, a diagram of a multi-element DF BAVA array structurally integrated as a continuous unit exemplary of an embodiment of the present invention is shown. BAVA array 110 may be comprised of multiple linearly polarized BAVA radiating elements 302. Each BAVA element may be oriented perpendicular to the plane of the overall array and able to receive a signal from 180 degrees of azimuth and elevation from the plane of the array 110. Individual BAVA elements 302 may be oriented in a first polarization 312 and a second polarization 314 to form a dual polarized array of individual elements. An equal number of BAVA elements oriented in each polarization may be employed to ensure accuracy over the full 180 degree coverage in azimuth and elevation.

A dual polarization sub-array 304 is comprised of an exemplary four BAVA elements oriented in a first polarization 312 associated with an exemplary four BAVA elements oriented in a second polarization 314. Each of the BAVA elements of the first and second polarization comprising the dual polarization sub-array 304 is adjacent to one another. It is contemplated herein; a plurality of adjacent or non-adjacent BAVA elements may comprise the dual polarization sub-array 304. Greater and lesser numbers of individual BAVA elements may create a sub-array 304 within the scope of the present invention.

The BAVA array 110 may be sized to permit a successful covert operation. For example, a size of $0.6\lambda_{low}$ wide by $0.6\lambda_{low}$ long by $0.06\lambda_{low}$ height may be realized with the BAVA array. Additionally, and exemplary $5\lambda_{high}$ wide by $5\lambda_{high}$ long by $0.5\lambda_{high}$ height may be realized with the BAVA array. For example, in a system 100 designed for a bandwidth from 700 MHz to 6 GHz, an approximate size of the BAVA array 110 is ten inches wide by 10 inches long by 1 inch height.

Figure 4:
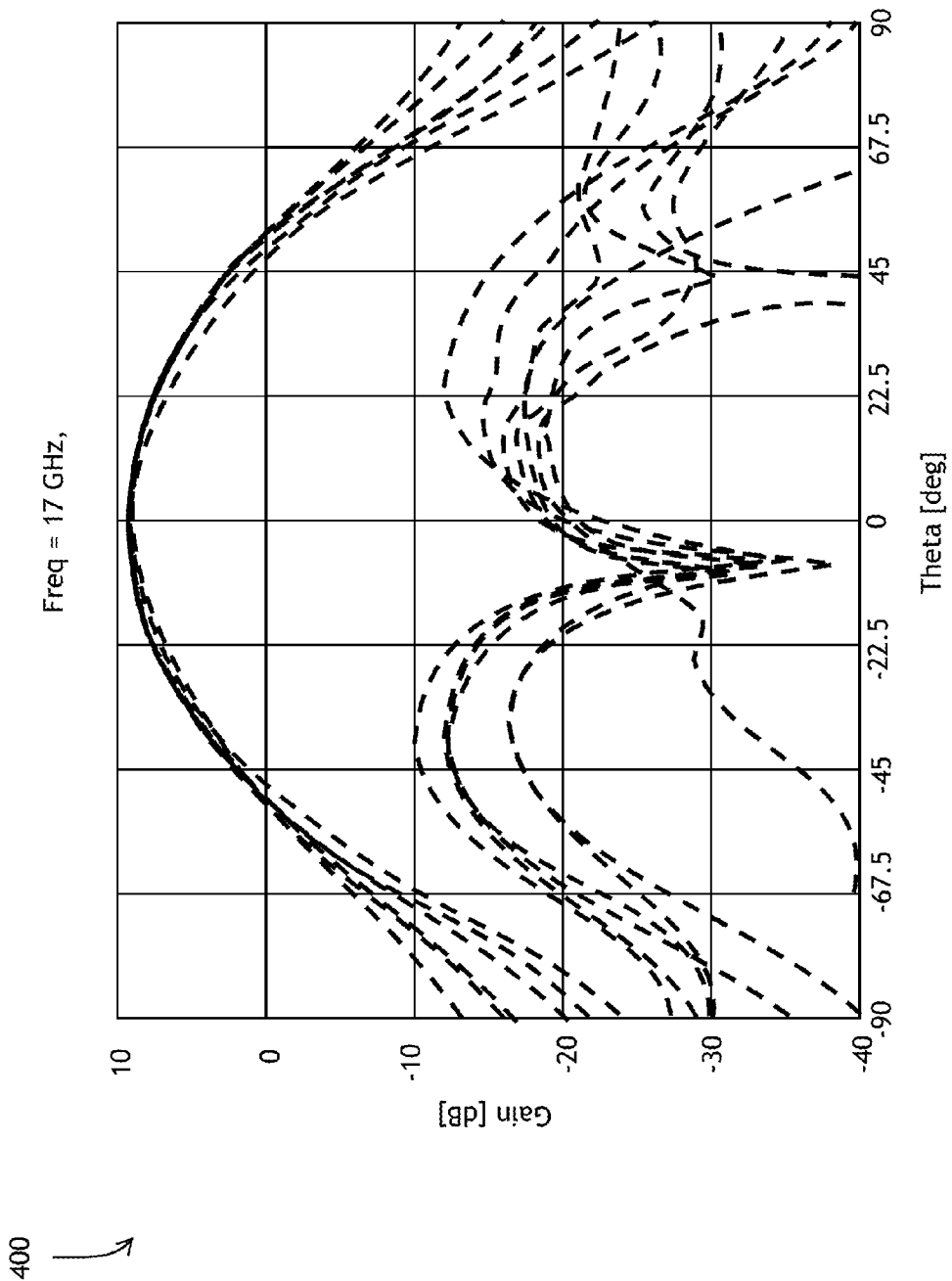
FIG. 4 is a graph of gain in dB versus theta in degrees at 17 GHz, indicating low cross-polarization in accordance with an embodiment of the present invention.

Referring to FIG. 4, a graph of gain in dB versus theta in degrees at 17 GHz, indicating low cross-polarization in accordance with an embodiment of the present invention is shown. As system 100 may receive a signal, desirable low cross-Polarization may be realized indicating a uniform gain curve throughout increasing Theta 210.

Figure 5:
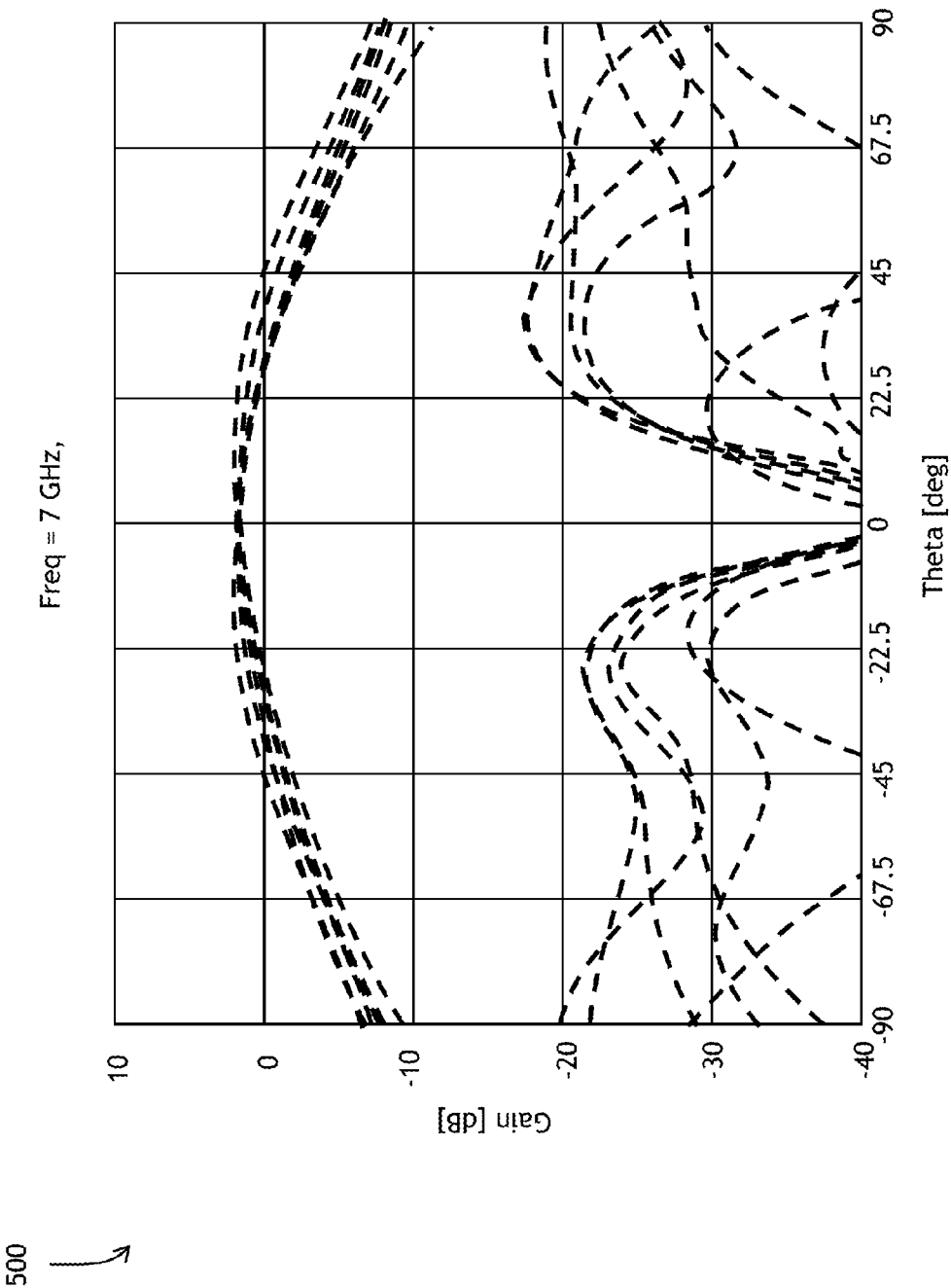
FIGS. 5 and 6 are graphs of gain in dB versus theta across azimuth (5 degree steps) at 7 and 2 GHz; indicating low wobble on the wave exemplary of an embodiment of the present invention.
Figure 6:
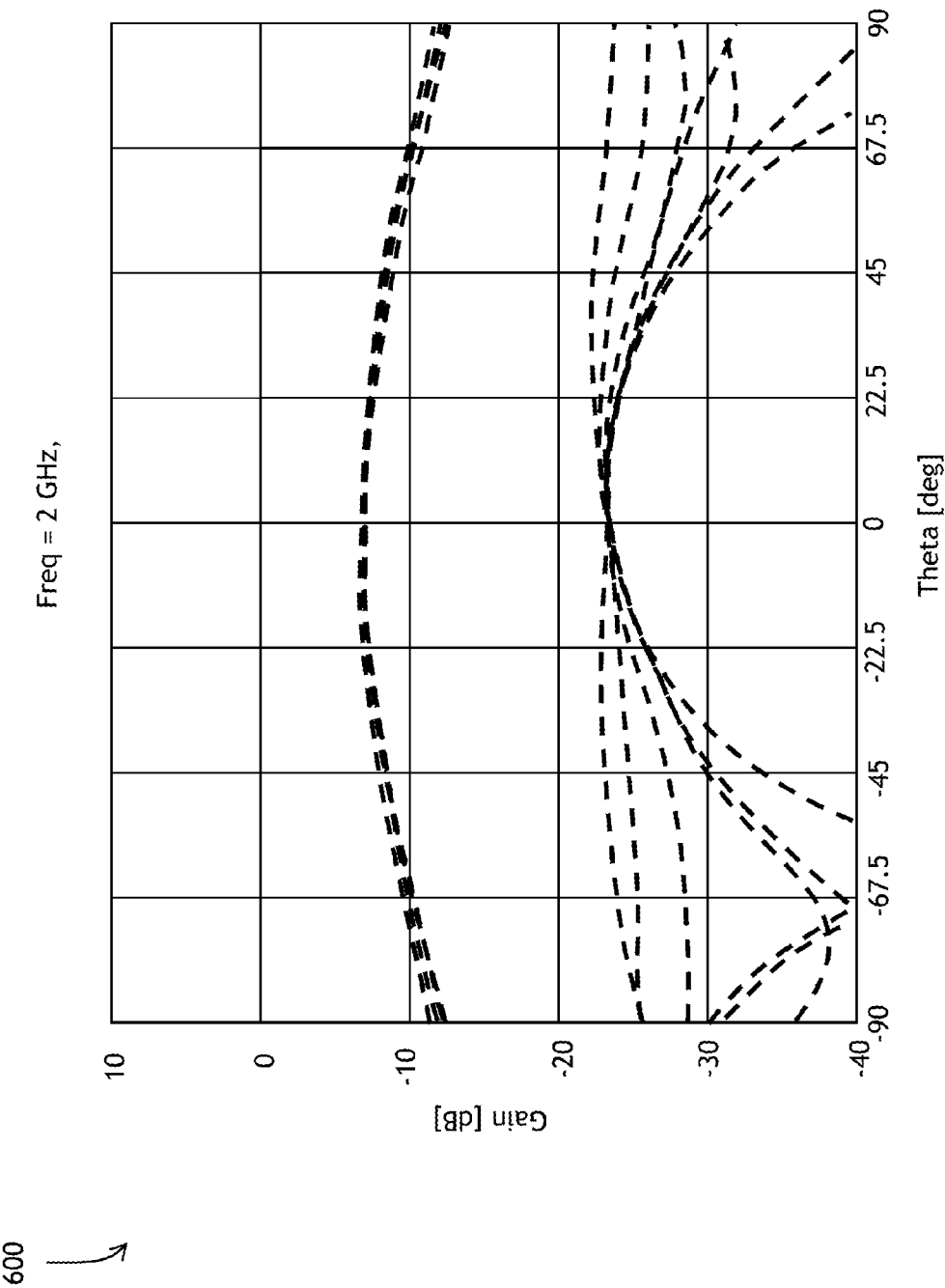

Referring to FIGS. 5 and 6, graphs of gain in dB versus theta across azimuth (5 degree steps) at 7 and 2 GHz; indicating low wobble on the wave exemplary of an embodiment of the present invention are shown. FIG. 5 at 7 GHz and FIG. 6 at 2 GHz both indicate examples of wide angle coverage, and a low WoW as is a desired quality of embodiments of system 100.

Figure 7:
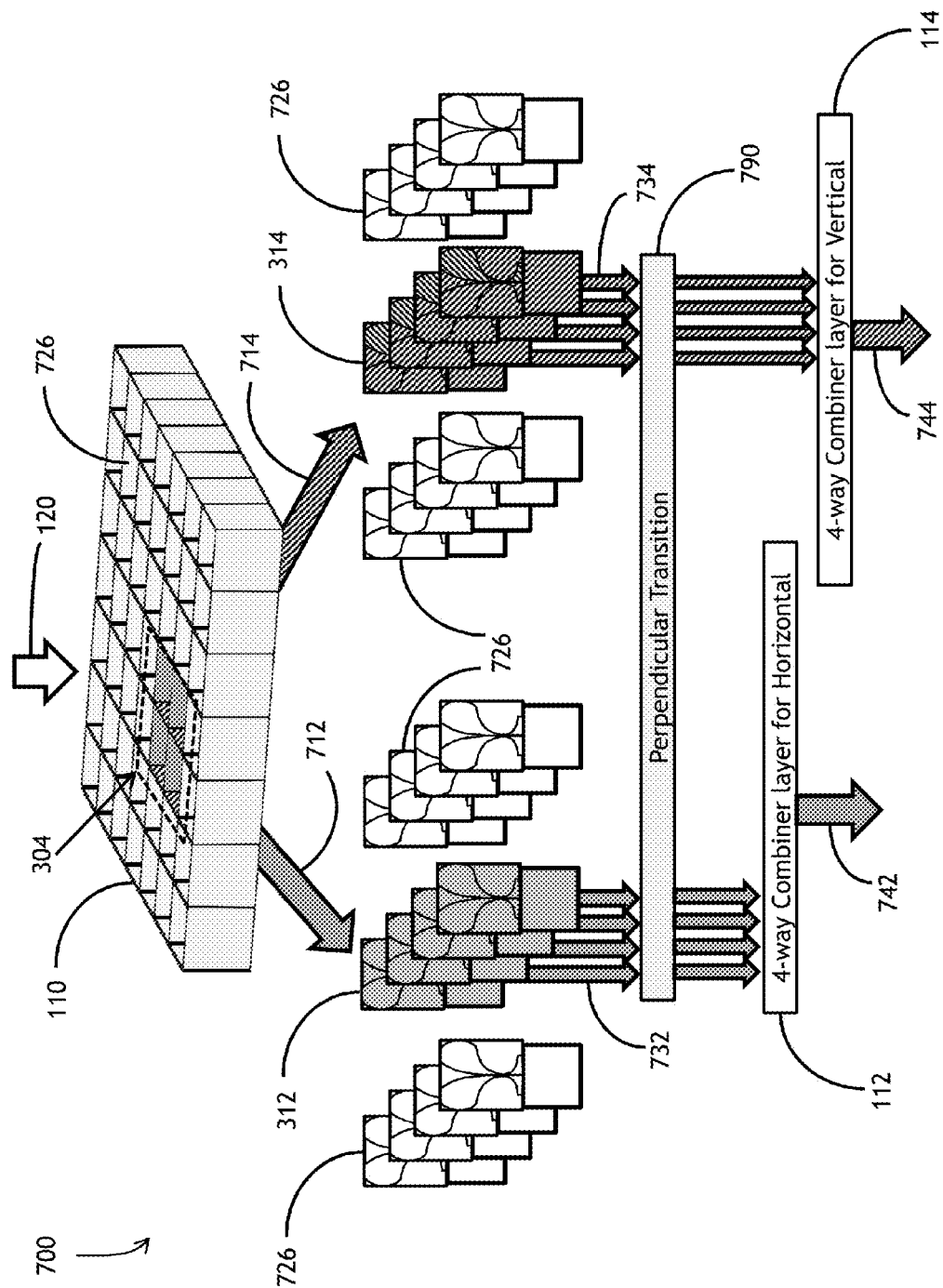
FIG. 7 is a diagram of one hardware configuration indicating dual polarized BAVA elements in an array with a path of signals received thereby exemplary of an embodiment of the present invention.

Referring to FIG. 7, a diagram of one hardware configuration indicating dual polarized BAVA elements in an array with a path of signals received thereby exemplary of an embodiment of the present invention is shown. System 700 includes BAVA array 110 comprising multiple BAVA elements oriented in a first polarization 312 and in a second polarization 314. Surrounding the dual polarization sub-array 304 are BAVA guard elements 726. The BAVA guard elements 726 are required for UWB performance.

These BAVA guard elements are BAVA radiating elements may be internally loaded with either resistive, matched terminations, or complex impedances to further reduce inter-DF element mutual coupling for ease in DF algorithm implementation. System 700 employs these BAVA guard elements 726 to adjust mutual coupling and parasitic interaction between the elements to maximize performance and radiation pattern of the active BAVA elements 312, 314. These BAVA guard elements 726, however, do not produce an output signal. BAVA guard elements 726 are further internally loaded with broadband terminations.

Signals of the first polarization 712 are collected by BAVA elements of the first polarization 312 and transmit the collected signals of the first polarizations 732 through perpendicular transition layer 790 to a combiner circuit of the first polarization 112. Once combined, system 700 further transmits a single combined signal of the first polarization 742.

Similarly, signals of the second polarization 714 are collected by BAVA elements of the second polarization 314 and the collected signals of the second polarization 734 are transmitted through perpendicular transition layer 790 to combiner layer of the second polarization 114. Once combined, system 700 further transmits a single combined signal of the second polarization 744.

For each dual polarized sub-array 304, system 700 transmits a single combined signal of the first polarization 742 and a single signal of the second polarization 744. BAVA guard elements 726 are oriented in both first polarization and second polarization and surround the dual polarization sub-array 304.

Figure 8:
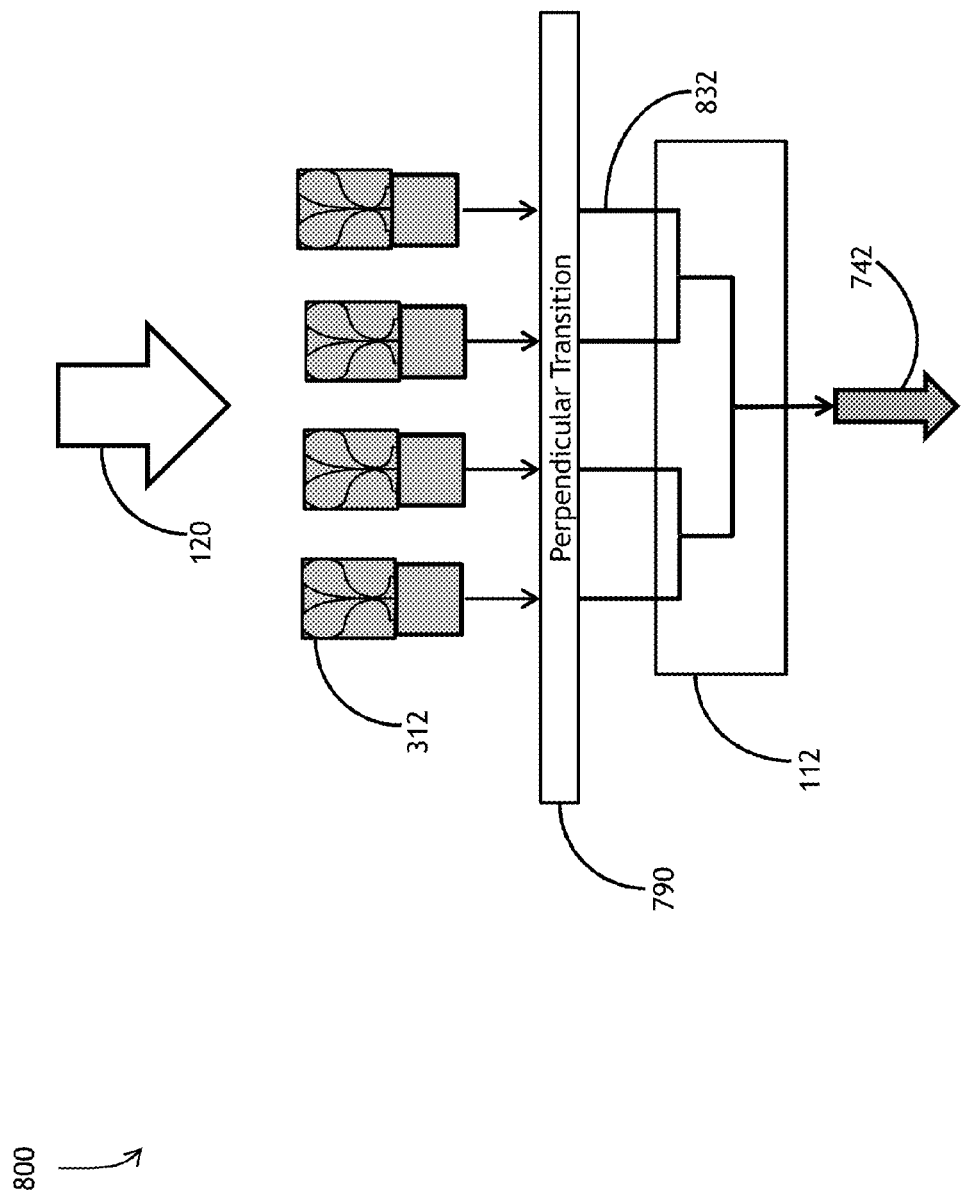
FIG. 8 is a diagram of exemplary four to one signal consolidation in accordance with an embodiment of the present invention.

Referring to FIG. 8, a diagram of exemplary four to one signal consolidation in accordance with an embodiment of the present invention is shown. Signal 120 is received by individual BAVA elements 312 (here of the first polarization). System 800 perpendicularly transitions the signals and sends the transitioned signals 832 to combiner circuit of the first polarization 112. System 800 transmits a single combined signal of the first polarization 742 (and signal of the second polarization 744) from combiner circuit 112 to additional elements.

The combiners of the first 112 and second 114 polarization of FIGS. 7 and 8 may be active Radio Frequency Integrated Circuit (RFIC) Ultra-Wide Band (UWB) circuits with integrated Low Noise Amplifier (LNA) circuits. Active combiners offer many advantages, including: 1) miniaturization of the feed network layers for the full array, as shown in FIG. 1, 2) the noise figure of the receive system can be optimized with LNAs for each BAVA element, and 3) the active LNA/combiner circuit may be more forgiving to the terminal impedances of the individual BAVA elements, which can further extend the lower frequency of operation for a given DF array size. The LNAs can either be integrated into the individual BAVA radiating element printed circuit cards, before the perpendicular transition, or they can be integrated into the UWB combiner RFIC, after the perpendicular transition.

Figure 9:
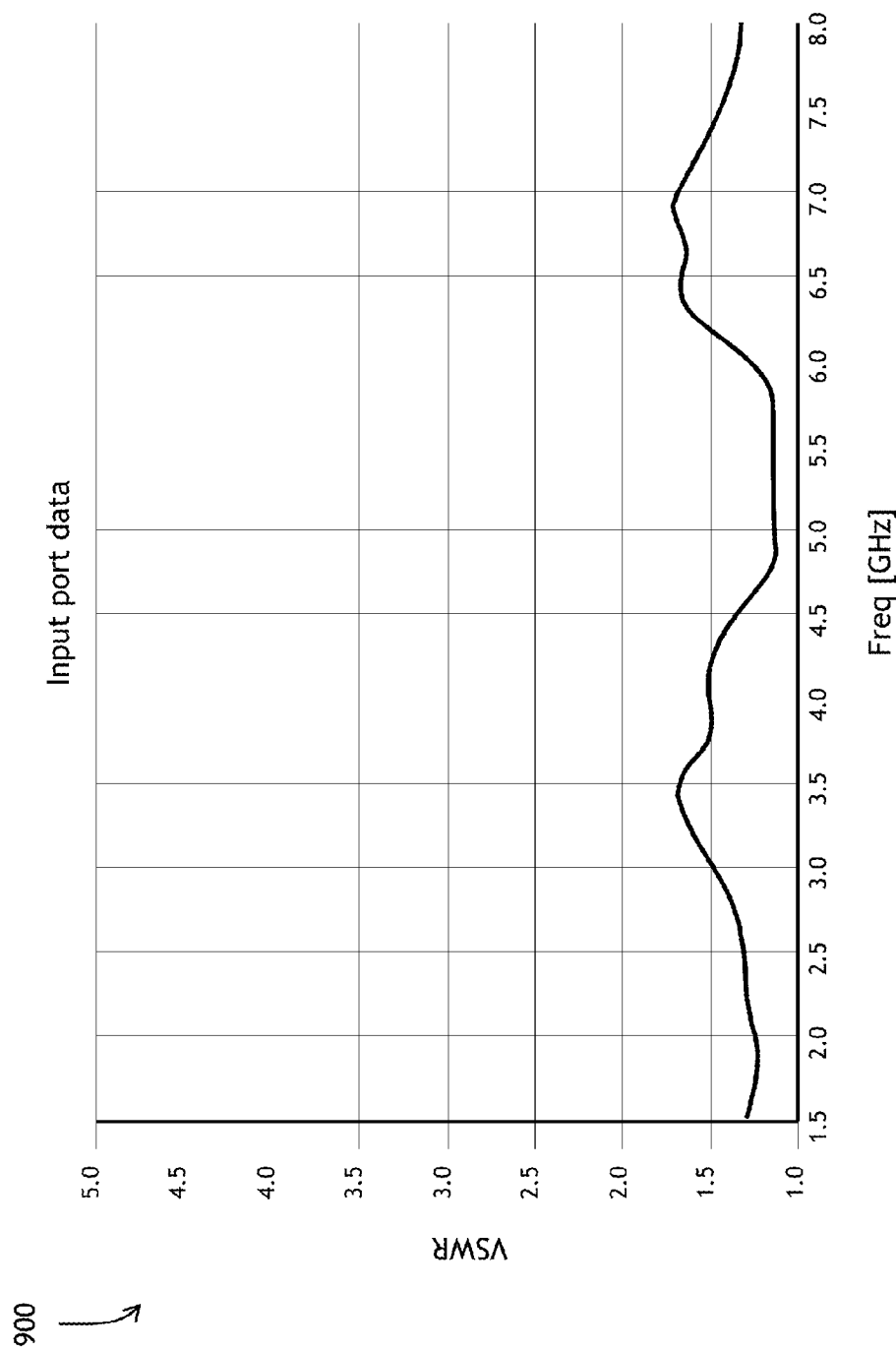
FIG. 9 is a graph of input port data displaying voltage standing wave ratio over frequency in GHz exemplary of an embodiment of the present invention.

Referring to FIG. 9, a graph of input port data displaying voltage standing wave ratio over frequency in GHz exemplary of an embodiment of the present invention is shown. At the combiner circuit 112 input, system 800 maintains a Voltage Standing Wave Ratio (VSWR) below 1.75 across the bandwidth of 1.5 to 8 GHz. System 800 VSWR may be measured at the power divider input port with all output ports terminated in 50 ohm loads.

An additional goal of the present invention is to maintain an impedance match at the output of each of the combiner circuits 112, 114. A Voltage Standing Wave Ratio (VSWR) of less than three at the combiner output may ensure the BAVA array matches the port impedance at the antenna with the port impedance at the combiner resulting in a lower return loss. In addition, it is contemplated a separate auxiliary impedance matching network may be employed to more closely match the two impedance values and further lower expected return loss.

Figure 10:
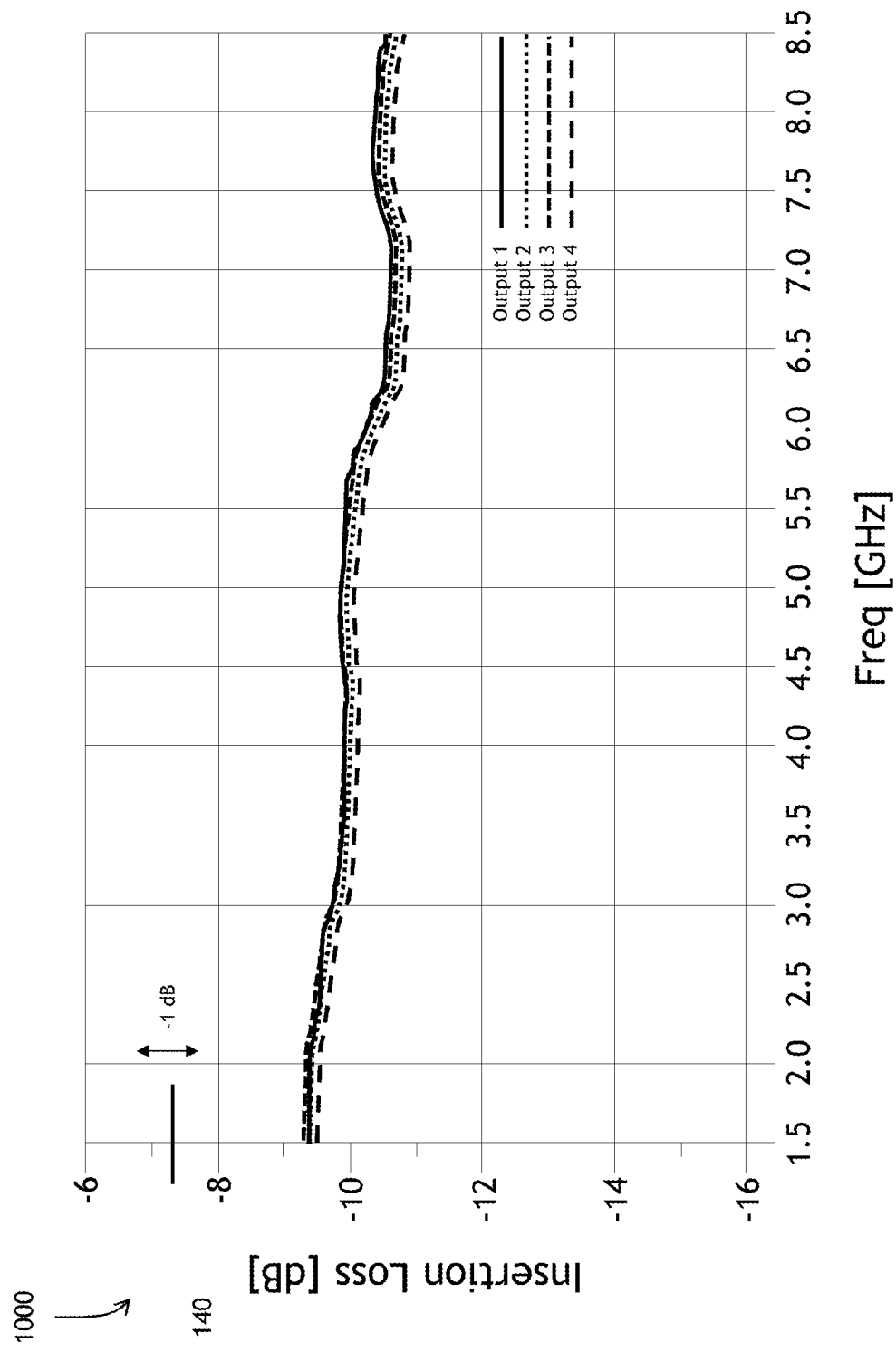
FIG. 10 is a graph of insertion loss in dB over frequency in GHz of eight exemplary outputs in accordance with an embodiment of the present invention.

Referring to FIG. 10, graph of insertion loss in dB over frequency in GHz of eight exemplary outputs in accordance with an embodiment of the present invention is shown. Insertion loss may be akin to a balance of power within each output signal. With a balanced power split between signals, system 800 may realize an evenly matched output of each BAVA element.

Figure 11:
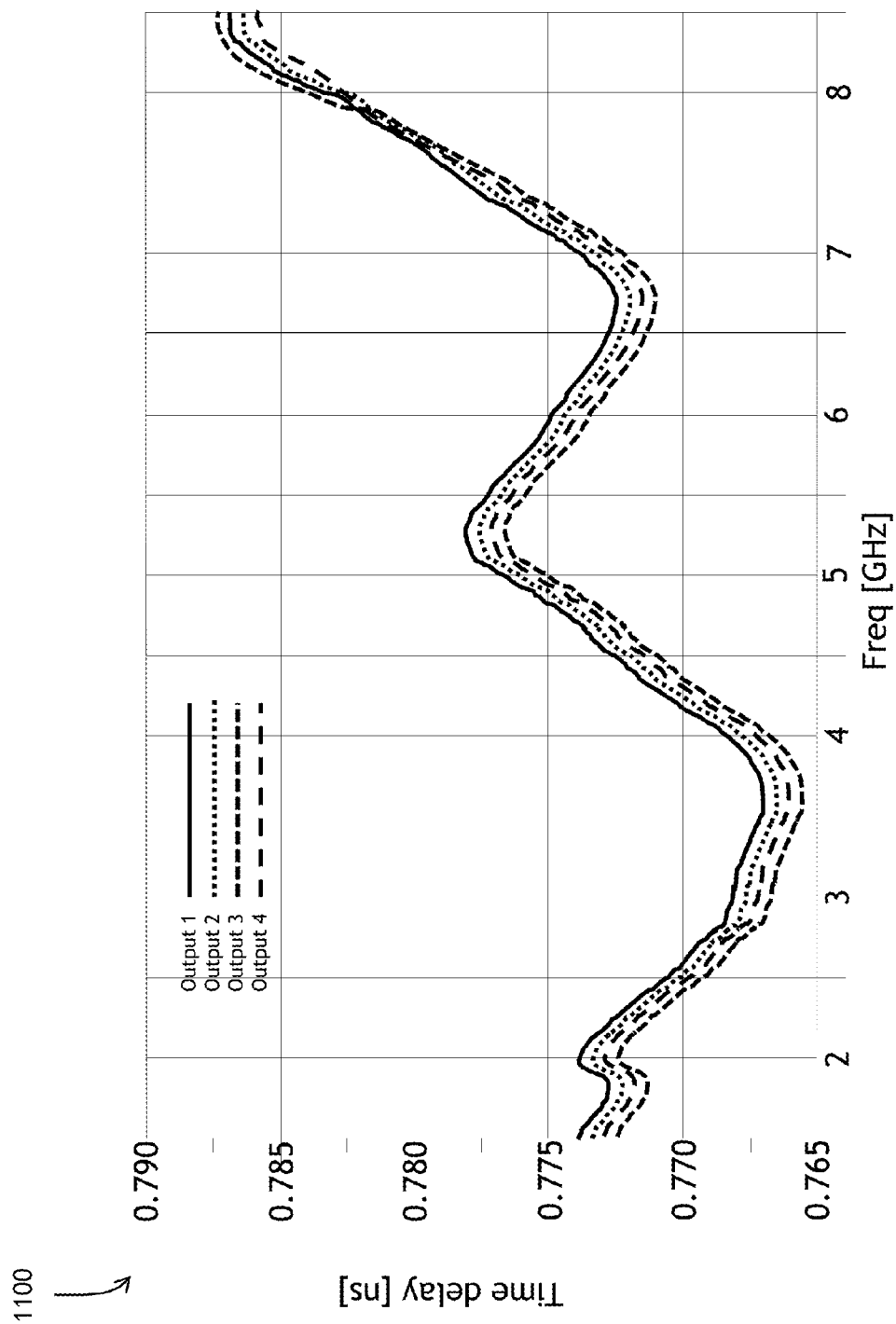
FIG. 11 is a graph of time delay in ns over frequency in GHz of eight exemplary outputs in accordance with an embodiment of the present invention.

Referring to FIG. 11, a graph of time delay in ns over frequency in GHz of eight exemplary outputs in accordance with an embodiment of the present invention is shown. A uniform time delay among outputs 1 through 4 may allow system 800 to realize very little delay in a signal reaching the intended port. Tight time delay uniformity implies tight phase uniformity or the wide band width, which is important for the UWB DF array.

Figure 12:
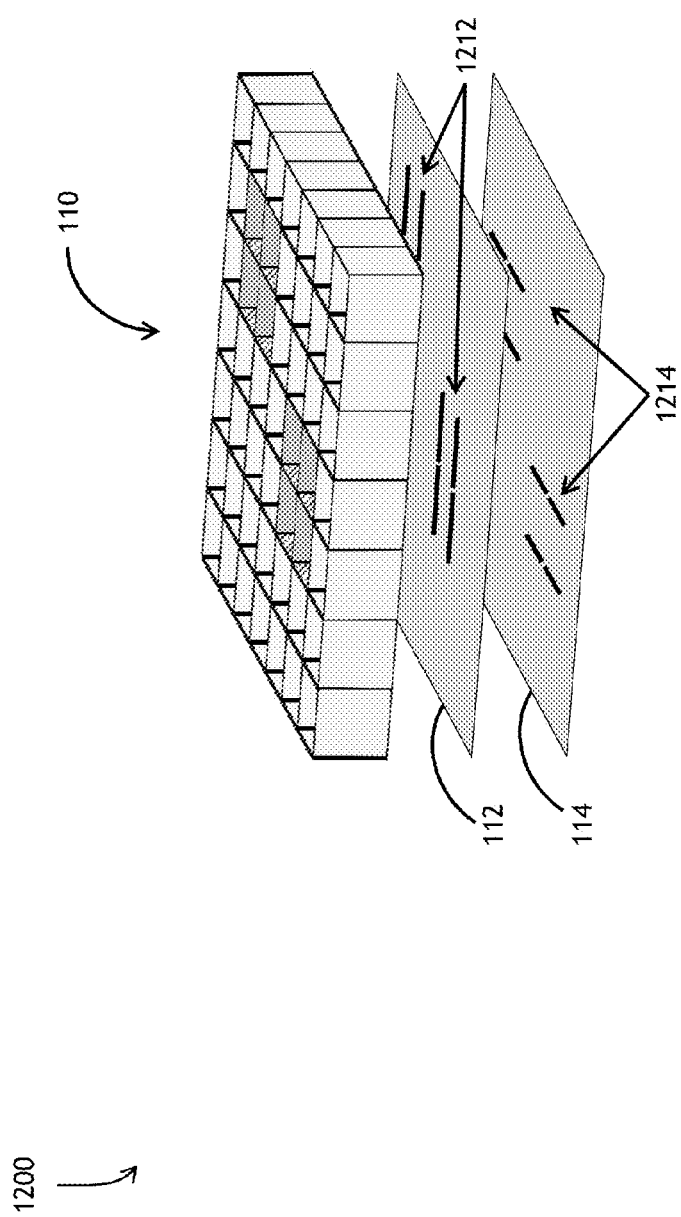
FIG. 12 is a diagram of two dual polarization BAVA sub-arrays embedded within a larger grid of BAVA elements exemplary of an embodiment of the present invention.

Referring to FIG. 12, a diagram of two dual polarization BAVA sub-arrays embedded within a larger grid of BAVA elements exemplary of an embodiment of the present invention is shown. BAVA array 110 is comprised of rows and columns of individual BAVA radiating elements. Within the overall BAVA array, an exemplary eight element dual polarization sub-array is embedded with four BAVA elements oriented in the first polarization and four elements oriented in the second polarization. Combiner circuit of the first polarization 112 and combiner circuit of the second polarization 114 receive the respective signal from the individual BAVA radiating elements. Specifically, the signal from elements of the first polarization 312 is applied to the combiner circuit of the first polarization 112 as indicated by signal 1212 while the BAVA elements of the second polarization correspond to signal of the second polarization 1214.

Figure 13:
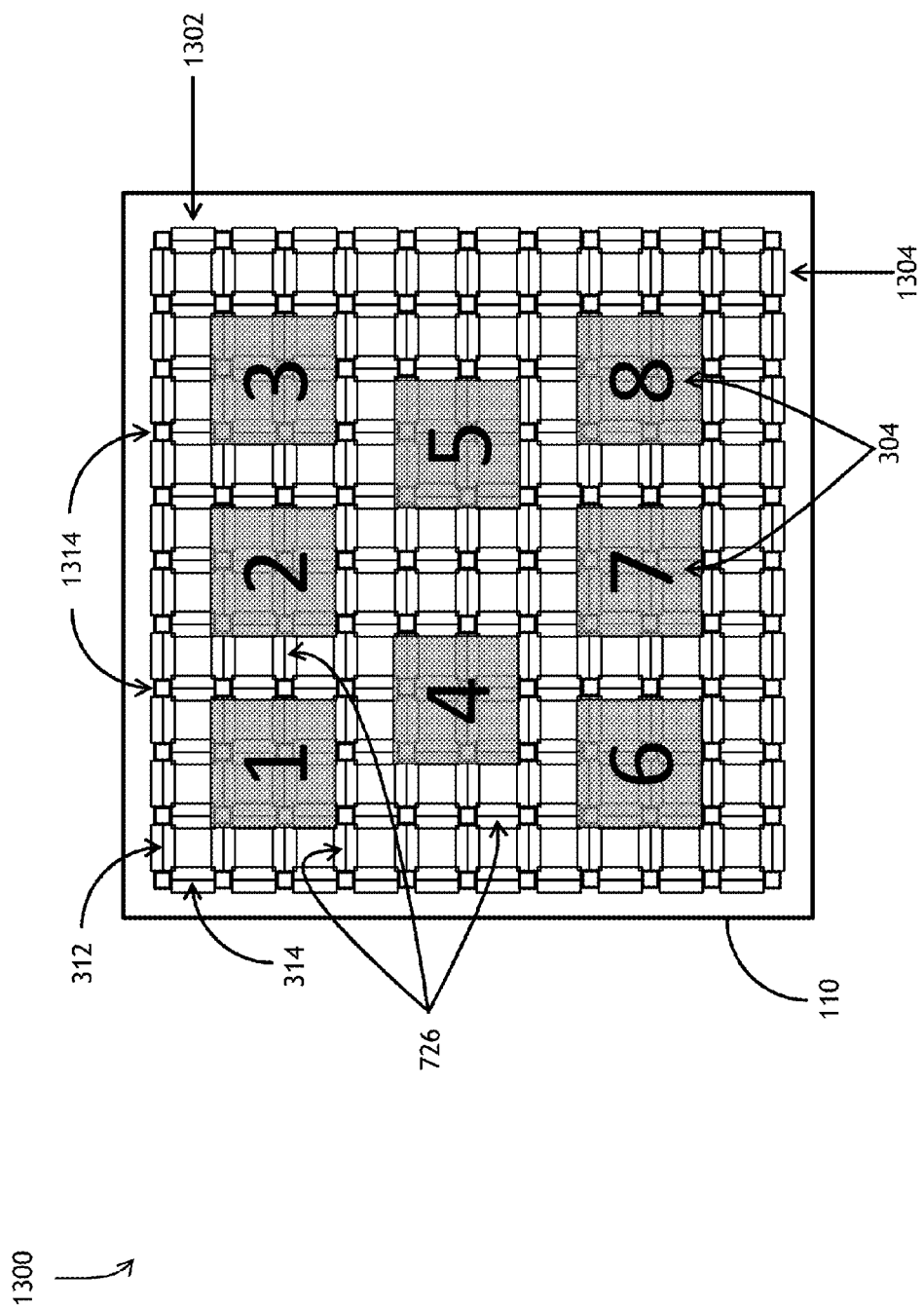
FIG. 13 is a diagram of multiple BAVA arrays embedded within a larger grid of BAVA elements exemplary of an embodiment of the present invention.

Referring to FIG. 13, a diagram of multiple BAVA arrays embedded within a larger grid of BAVA elements exemplary of an embodiment of the present invention is shown. Here, a more detailed diagram of the exemplary BAVA array 110 shows individual BAVA radiating elements oriented in the first 312 and second 314 polarization and BAVA array posts 1314 which act to support and align each individual BAVA radiating element. The BAVA array posts also provide reactance to ground to further broaden the array's bandwidth. BAVA guard elements 726 surround each of the dual polarization BAVA sub-arrays 304. BAVA radiating elements are oriented into rows 1302 and columns 1304 to organize the array. System 1300 may realize a frequency band of 700 MHz to 6 GHz in the displayed configuration.

With combiner circuits 112 114 detailed in FIGS. 8 and 12, BAVA array 110 will have an exemplary total of 16 output ports; eight output ports of the first polarization and eight outputs ports of the second polarization.

Figure 14A:
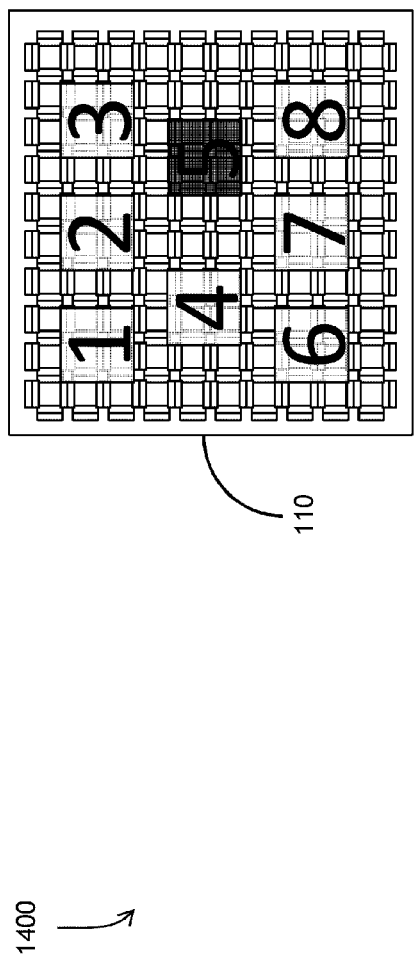
FIG. 14A is a diagram of multiple BAVA dual polarization sub-arrays embedded within a larger BAVA array with a single active sub-array of eight sub-arrays exemplary of an embodiment of the present invention.

Referring to FIG. 14A, a diagram of multiple BAVA dual polarization sub-arrays embedded within a larger BAVA array with a single active sub-array of eight sub-arrays exemplary of an embodiment of the present invention is shown. BAVA sub-array 5 is active in FIG. 14 indicating a center-to-right location of the single radiating sub-array within the larger full array 110.

Figure 14D:
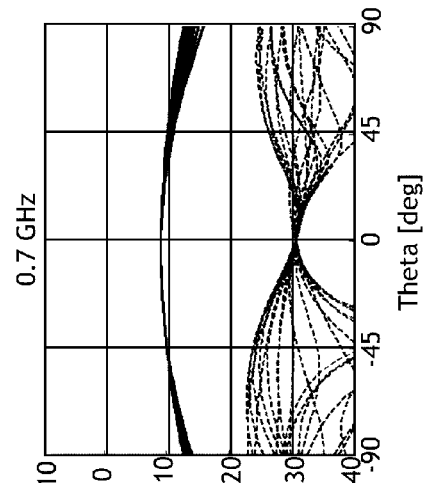
FIGS. 14B-14D are graphs of gain in dB versus theta in degrees representative of an embodiment of the present invention.
Figure 14C:
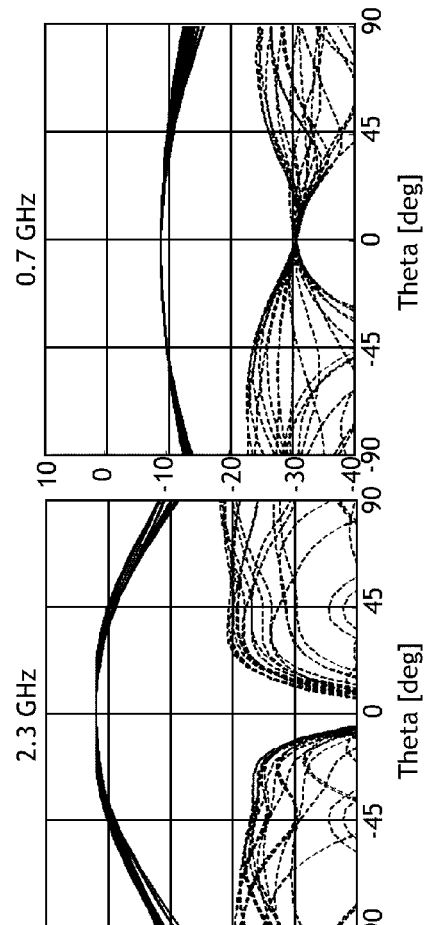
Figure 14B:
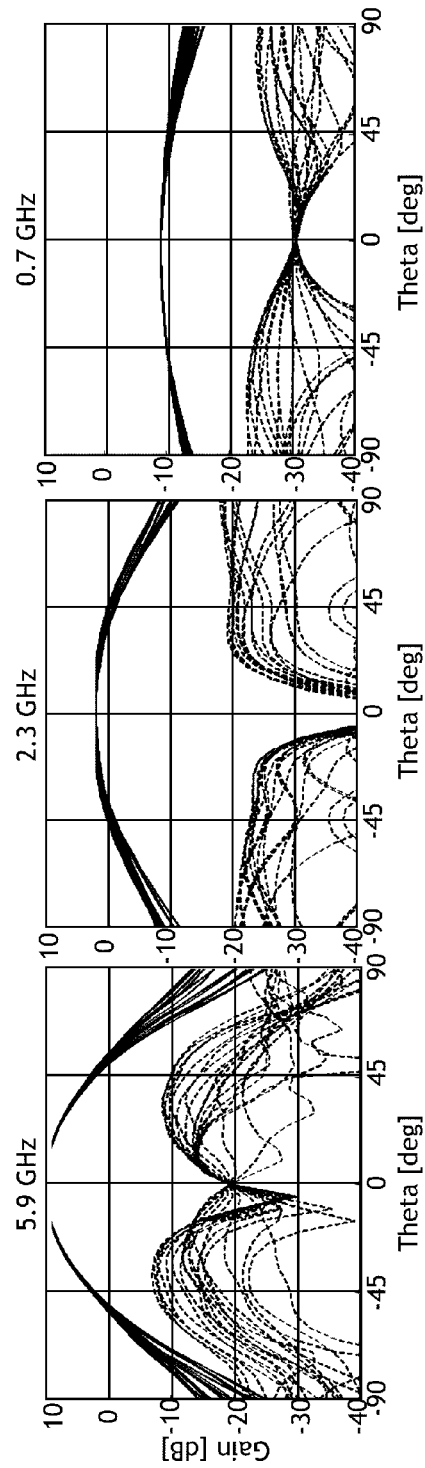

Referring to FIGS. 14B-14D, graphs of gain in dB versus theta in degrees representative of an embodiment of the present invention are shown.

FIG. 14B represents gain at 5.9 GHz, Polarization 01; Gain=9.8 dB isotropic linear (dBiL), BW=54.2 degrees, with Ripples at 45 degrees=1 dB. FIG. 14C represents gain at 2.3 GHz, Polarization 01; Gain=1.85 dBiL, BW=104 degrees, with Ripples at 45 degrees=1.1 dB. FIG. 14D represents gain at 0.7 GHz, Polarization 01; Gain=−9.5 dBiL, BW=142 degrees, with Ripples at 45 degrees=2 dB.

Referring to FIG. 15A, a diagram of multiple BAVA dual polarization sub-arrays embedded within a larger BAVA array with a single active sub-array of eight sub-arrays exemplary of an embodiment of the present invention is shown.

Referring to FIGS. 15B-15D, graphs of gain in dB versus theta in degrees representative of an embodiment of the present invention are shown.

FIG. 15B represents gain at 5.9 GHz, Polarization 01; Gain=9.8 dBiL, BW=53.8 degrees, with Ripples at 45 degrees=1 dB. FIG. 15C represents gain at 2.3 GHz, Polarization 01; Gain=1.9 dBiL, BW=80 degrees, with Ripples at 45 degrees=1.1 dB. FIG. 15D represents gain at 0.7 GHz, Polarization 01; Gain=−9.8 dBiL, BW=86 degrees, with Ripples at 45 degrees=2 dB.

Referring to FIG. 16A, a diagram of multiple BAVA dual polarization sub-arrays embedded within a larger BAVA array with a single active sub-array of eight sub-arrays exemplary of an embodiment of the present invention is shown.

Referring to FIGS. 16B-16D, graphs of gain in dB versus theta in degrees representative of an embodiment of the present invention are shown.

FIG. 16B represents gain at 5.9 GHz, Polarization 01; Gain=9.8 dBiL, BW=54.2 degrees, with Ripples at 45 degrees=1 dB. FIG. 16C represents gain at 2.3 GHz, Polarization 01; Gain=1.85 dBiL, BW=104 degrees, with Ripples at 45 degrees=1.1 dB. FIG. 16D represents gain at 0.7 GHz, Polarization 01; Gain=−9.5 dBiL, BW=142 degrees, with Ripples at 45 degrees=2 dB.

Referring to FIG. 17A, a diagram of multiple BAVA dual polarization sub-arrays embedded within a larger BAVA array with a single active sub-array of eight sub-arrays exemplary of an embodiment of the present invention is shown.

Referring to FIGS. 17B-17D, graphs of gain in dB versus theta in degrees representative of an embodiment of the present invention are shown.

FIG. 17B represents gain at 5.9 GHz, Polarization 01; Gain=9.8 dBiL, BW=53.8 degrees, with Ripples at 45 degrees=1 dB. FIG. 17C represents gain at 2.3 GHz, Polarization 01; Gain=1.9 dBiL, BW=80 degrees, with Ripples at 45 degrees=1.1 dB. FIG. 17D represents gain at 0.7 GHz, Polarization 01; Gain=−9.8 dBiL, BW=86 degrees, with Ripples at 45 degrees=2 dB.

Figure 18A:
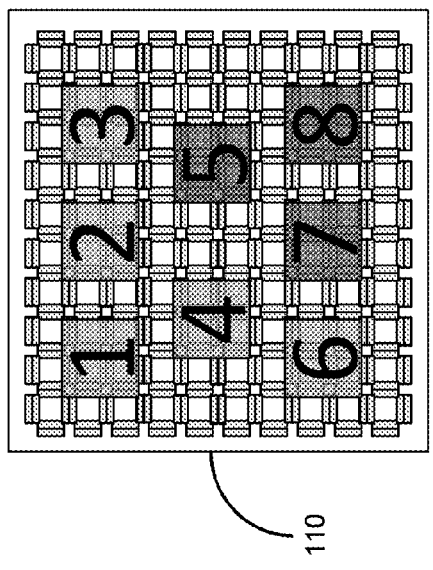
FIG. 18A is a diagram of multiple dual polarization BAVA DF sub-arrays embedded within a larger array of BAVA elements with three active sub-arrays exemplary of an embodiment of the present invention.

Referring to FIG. 18A, diagram of multiple dual polarization BAVA DF sub-arrays embedded within a larger array of BAVA elements with three active sub-arrays exemplary of an embodiment of the present invention is shown. Active sub-arrays 5, 7, and 8 are indicated by darker shading while inactive sub-arrays 1-3, 4 and 6 are of lighter shading.

Figure 18B:
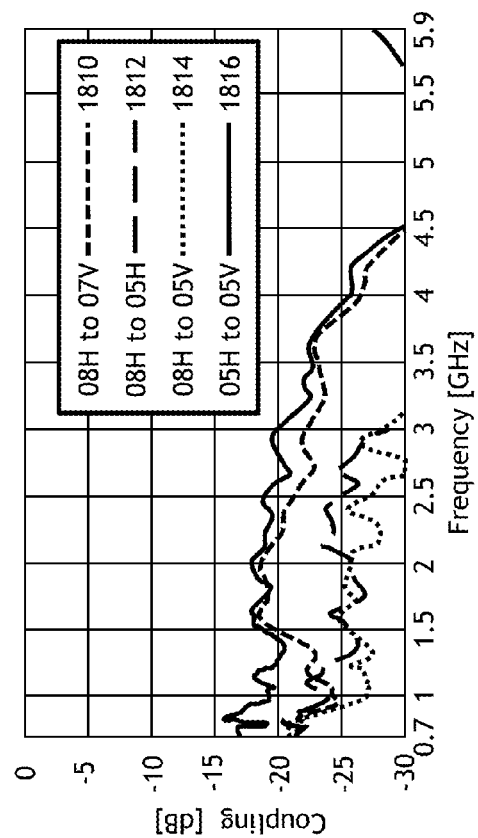
FIG. 18B is a graph of mutual coupling in dB between embedded dual polarization BAVA DF sub-arrays in accordance with an embodiment of the present invention.

Referring to FIG. 18B, graph of mutual coupling in dB between embedded dual polarization BAVA DF sub-arrays in accordance with an embodiment of the present invention is shown. Mutual coupling is displayed between BAVA elements of one sub-array are analyzed against BAVA elements of a second sub-array. Desirable values of less than −15 are indicated as system 1800 is active.

Embodiments of the present invention fall within a moderately low to a very low mutual coupling range requiring minimal element to element calibration. DF algorithms require the low mutual coupling found herein (e.g., less than approximately −15 for desired operation). Further, the low mutual coupling of system 100 is remarkable considering the densely spaced BAVA radiating elements found within.

Desirable low mutual coupling is indicated between BAVA DF sub-arrays 5, 7 and 8. 08H refers to the four BAVA elements of the first polarization (here illustratively horizontal (H)) within BAVA sub-array 8. Similarly, 07V refers to the four BAVA elements of the second polarization (here illustratively vertical (V)) in sub-array 7, etc. Curve 1810 indicates the mutual coupling in dB between the horizontal BAVA elements of Sub-array 08 and the vertical BAVA elements of sub-array 7. For example, at 3 GHz, the mutual coupling between 08H and 07V is approximately −22.3 dB. Similarly. Curves 1812 and 1814 compare mutual coupling and cross polarization of vertical and horizontal BAVA elements of the indicated sub-arrays. Conversely, curve 1816 compares horizontal BAVA elements of sub-array 05 to the vertical BAVA elements within the same sub-array 05. As can be seen, mutual coupling and cross polarization rejection falls within a desirable low range of −15 to −30 for multiple frequency reception.

Precise DF algorithms require minimization of mutual coupling between the radiating elements. The BAVA guard elements 726 with resistively match terminations, as described herein, enable low DF element-to-DF element mutual coupling. It is contemplated herein; system 100 may further reduce mutual coupling by optimizing complex terminations (i.e.: $Z_{load}$=[resistance]+J[reactance]). System 100 introduction of a reactive impedance within each guard element 726 may further reduce mutual coupling between the active BAVA radiating elements.

It is further contemplated; system 100 may impose dynamic scaling of which individual BAVA elements are a part of the dual polarization BAVA sub-array. For example, a switching system may enable system 100 to employ a specific number of BAVA elements as a portion of the dual polarization sub-array. A sub-array may include a number of individual BAVA elements greater than the exemplary eight disclosed herein. In addition, only singly polarized (first or second) BAVA elements may desirable to function within the sub-array in specific operational circumstances. It is further contemplated; a sub-array may be comprised of individual BAVA elements not adjacent to one another.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A system for determining a direction of arrival of a signal, comprising:
   a plurality of Balanced Antipodal Vivaldi Antenna (BAVA) elements, the plurality of BAVA elements structured in an array;
   an active dual polarization sub-array of the plurality of BAVA elements within the array, the active dual polarization sub-array including a first set of at least four BAVA elements oriented in a first polarization and a first set of at least four BAVA elements oriented in a second polarization, the second polarization being orthogonal to the first polarization, the first set of at least four BAVA elements oriented in the first polarization and the first set of at least four BAVA elements oriented in the second polarization being adjacent to each other;
   a plurality of guarded dual polarization sub-arrays of the plurality of BAVA elements within the array, each of the plurality of dual polarization sub-arrays including a second set of at least four BAVA elements oriented in the first polarization and a second set of at least four BAVA elements oriented in the second polarization, the second set of at least four BAVA elements oriented in the first polarization and the second set of at least four BAVA elements oriented in a second polarization being adjacent to each other, and each of the plurality of guarded dual polarization sub-arrays including a dual polarization sub-array and a BAVA guard element adjacent thereto;
   a combiner circuit of the first polarization configured for receiving an output from the BAVA elements oriented in the first polarization and combining the output to produce a combined signal of the first polarization;
   a combiner circuit of the second polarization configured for receiving an output from the BAVA elements oriented in the second polarization and combining the output to produce a combined signal of the second polarization;
   a processor configured for:
      receiving an input including the combined signal of the first polarization and the combined signal of the second polarization;
      determining a direction of arrival of the signal based on the input; and
      transmitting the determined direction of arrival to one of: a display and a communications link.

2. The system for determining a direction of arrival of a signal of claim 1, wherein the plurality of BAVA elements structured in an array further comprises a symmetric array of rows and columns of BAVA elements, having an egg-crate design, the egg-crate design comprising the plurality of BAVA elements positioned in 10 rows of BAVA elements orthogonal to and layered with 10 columns of BAVA elements, each row comprising 11 BAVA elements and each column comprising 11 BAVA elements, the columnar BAVA elements oriented perpendicular to a direction of the columns and the rowed BAVA elements oriented perpendicular to a direction of the row.

3. The system for determining a direction of arrival of a signal of claim 1, wherein each of the plurality of guarded dual polarization sub-arrays is distant from 1) the active dual polarization sub-array and 2) a second guarded dual polarization sub-array of the plurality of guarded dual polarization sub-arrays by at least one of: a row of BAVA guard elements and a column of BAVA guard elements.

4. The system for determining a direction of arrival of a signal of claim 1, wherein the each of plurality of guarded dual polarization sub-arrays is adjacent to at least one of: the active dual polarization sub-array and a second guarded dual polarization sub-array of the plurality of guarded dual polarization sub-arrays.

5. The system for determining a direction of arrival of a signal of claim 1, wherein the plurality of guarded dual polarization sub-arrays further comprises at least seven dual polarization sub-arrays oriented with at least one of: a row of BAVA guard elements and a column of BAVA guard elements between each one of the seven dual polarization sub-arrays within the array.

6. The system for determining a direction of arrival of a signal of claim 1, wherein the plurality of guarded dual polarization sub-arrays further comprises at least seven dual polarization sub-arrays, each one of the seven dual polarization sub-arrays is oriented adjacent to at least two other dual polarization sub-arrays of the seven dual polarization sub-arrays.

7. A method for determining a direction of arrival of a received signal, comprising:
orienting a plurality of Balanced Antipodal Vivaldi Antenna (BAVA) elements into an array of rows and columns, the array sized for direction finding of a signal;
designating at least eight BAVA elements of the plurality of BAVA elements as elements of a first dual polarization sub-array;
designating a first set of at least four BAVA elements of the first dual polarization sub-array as first polarization elements and a second set of at least four BAVA elements of the first dual polarization sub-array as second polarization elements, the second polarization elements being adjacent and orthogonal to the first polarization elements;
designating a third set of at least four BAVA elements of the plurality of BAVA elements as first polarization elements of a plurality of dual polarization sub-arrays and a fourth set of at least four BAVA elements of the plurality of BAVA elements as second polarization elements of the plurality of dual polarization sub-arrays, each one of the plurality of dual polarization sub-arrays being independent of the first dual polarization sub-array;
designating a fifth set of at least four BAVA elements of the plurality of BAVA elements as guard elements to be positioned between, or adjacent to, each of the plurality of dual polarization sub-arrays;
receiving a signal, via at least one of: the first dual polarization sub-array and the plurality of dual polarization sub-arrays;
combining the signal from each one of the BAVA elements of the first polarization within each dual polarization sub-array to a combined signal of the first polarization;
combining the signal from each one of the BAVA elements of the second polarization within each dual polarization sub-array to a combined signal of the second polarization;
determining the direction of arrival of the received signal based on the combined signal of the first polarization and the combined signal of the second polarization; and
transmitting the direction of arrival of the received signal via a omnidirectional transmitter.

8. The method for determining a direction of arrival of a received signal of claim 7, wherein orienting the plurality of BAVA elements into an array of rows and columns further comprises orienting the plurality of BAVA elements into an egg-crate design, the egg-crate design having a symmetric array of BAVA elements oriented in 10 rows of BAVA elements orthogonal to and layered with 10 columns of BAVA elements, each row comprising 11 BAVA elements and each column comprising 11 BAVA elements, the columnar BAVA elements oriented perpendicular to a direction of the columns and the rowed BAVA elements oriented perpendicular to a direction of the row.

9. The method for determining a direction of arrival of a received signal of claim 7, wherein each sub-array of the plurality of dual polarization sub-arrays is distant from 1) the first dual polarization sub-array and 2) a second dual polarization sub-array of the plurality of dual polarization sub-arrays by at least one of: a row of BAVA guard elements and a column of BAVA guard elements.

10. The method for determining a direction of arrival of a received signal of claim 7, wherein the second polarization elements are orthogonal to the first polarization elements with respect to location and polarization.

11. The method for determining a direction of arrival of a received signal of claim 7, wherein the plurality of dual polarization sub-arrays further comprises at least seven guarded dual polarization sub-arrays, and wherein the at least seven guarded dual polarization sub-arrays comprise at least seven dual polarization sub-arrays oriented with at least one of: a row of BAVA guard elements and a column of BAVA guard elements between each one of the seven dual polarization sub-arrays within the array.

12. The method for determining a direction of arrival of a received signal of claim 7, wherein the plurality of dual polarization sub-arrays further comprises at least seven dual polarization sub-arrays, each one of the seven dual polarization sub-arrays is oriented adjacent to at least two other dual polarization sub-arrays of the seven dual polarization sub-arrays.

13. The method for determining a direction of arrival of a received signal of claim 7, wherein combining the signal from each one of the BAVA elements of the first polarization and BAVA elements of the second polarization within each dual polarization sub-array to a combined signal of the first polarization and a combined signal of the second polarization further comprises combining signals using a first four-to-one signal combiner resulting in a single signal of the first polarization and combining signals using a second four-to-one signal combiner resulting in a single signal of the second polarization, wherein the resulting single signals comprise the signal from each one of the BAVA elements of a respective polarization of respective dual polarization sub-arrays, and wherein determining the direction of arrival of the received signal based on the combined signal of the first polarization and the combined signal of the second polarization comprises using a realized gain of the plurality of BAVA elements.

14. A method for determining a direction of arrival of a received signal, comprising:
- situating, by a plurality of posts, a plurality of Balanced Antipodal Vivaldi Antenna (BAVA) elements into an array of rows and columns, the array sized for direction finding of a signal;
- identifying, by a processor, a plurality of guarded dual polarization sub-arrays within the array, wherein a guarded dual polarization sub-array of the plurality of guarded dual polarization sub-arrays comprises a dual polarization sub-array having an adjacent BAVA guard element;
- receiving, by at least one of the plurality of guarded dual polarization sub-arrays, a signal according to a first polarization and a second polarization;
- combining a first output of the first polarization from the at least one of the plurality of guarded dual polarization sub-arrays to produce a combined signal of the first polarization;
- combining a second output of the second polarization from the at least one of the plurality of guarded dual polarization sub-arrays to produce a combined signal of the second polarization;
- determining, by the processor, the direction of arrival of the received signal based on the combined signal of the first polarization and the combined signal of the second polarization;
- transmitting, by a transmitter, the direction of arrival of the received signal.

15. The method for determining a direction of arrival of a received signal of claim 14, wherein the plurality of posts situate the plurality of BAVA elements into a symmetric array of BAVA elements oriented in 10 rows of BAVA elements orthogonal to and layered with 10 columns of BAVA elements, each row comprising 11 BAVA elements and each column comprising 11 BAVA elements, the columnar BAVA elements oriented perpendicular to a direction of the columns and the rowed BAVA elements oriented perpendicular to a direction of the row.

16. The method for determining a direction of arrival of a received signal of claim 14, wherein the plurality of posts situate each sub-array of the plurality of guarded dual polarization sub-arrays with a row of BAVA guard elements or a column of BAVA guard elements respectively between the sub-array and another sub-array of the plurality of guarded dual polarization sub-arrays, and wherein the row or the column is situated with a size of $0.6\lambda_{low}$ in width $0.6\lambda_{low}$ in length, and $0.06\lambda_{low}$ in height.

17. The method for determining a direction of arrival of a received signal of claim 14, wherein each sub-array of the plurality of guarded dual polarization sub-arrays is adjacent to at least two other sub-arrays of the plurality of guarded dual polarization sub-arrays.

18. The method for determining a direction of arrival of a received signal of claim 14, wherein the plurality of guarded dual polarization sub-arrays further comprises at least eight dual polarization sub-arrays oriented with at least one of: a row of BAVA guard elements and a column of BAVA guard elements between each one of the dual polarization sub-arrays within the array.

19. The method for determining a direction of arrival of a received signal of claim 14, wherein combining the output of the first polarization and combining the output of the second polarization results in a single signal of the first polarization and a single signal of the second polarization, the single signal of a respective polarization comprising a signal received from each BAVA element of the respective polarization of a respective dual polarization sub-array.

20. The system for determining a direction of arrival of a signal of claim 1, wherein the active dual polarization sub-array comprises a first guarded dual polarization sub-array having at least one guard element (1) adjacent to the active dual polarization sub-array, (2) between a polarized element of the first polarization of the first guarded dual polarization sub-array and a polarized element of the first polarization of a second guarded dual polarization sub-array, or (3) between a polarized element of the second polarization of the first guarded dual polarization sub-array and a polarized element of the second polarization of the second guarded dual polarization sub-array.

* * * * *